(12) United States Patent
Freire et al.

(10) Patent No.: US 8,762,186 B2
(45) Date of Patent: Jun. 24, 2014

(54) ANALOGY BASED WORKFLOW IDENTIFICATION

(75) Inventors: Juliana Freire, Salt Lake City, UT (US); Claudio T. Silva, Salt Lake City, UT (US); Carlos E. Scheidegger, Salt Lake City, UT (US); Huy T. Vo, Murray, UT (US); David Koop, Salt Lake City, UT (US)

(73) Assignee: The University of Utah Research Foundation, Salt Lake City, UT (US)

(*) Notice: Subject to any disclaimer, the term of this patent is extended or adjusted under 35 U.S.C. 154(b) by 125 days.

(21) Appl. No.: 13/243,541

(22) Filed: Sep. 23, 2011

(65) Prior Publication Data
US 2012/0095801 A1   Apr. 19, 2012

Related U.S. Application Data

(62) Division of application No. 11/697,929, filed on Apr. 9, 2007, now Pat. No. 8,060,391.

(60) Provisional application No. 60/790,046, filed on Apr. 7, 2006.

(51) Int. Cl.
   *G06Q 10/00* (2012.01)
(52) U.S. Cl.
   USPC ........................................ 705/7.11
(58) Field of Classification Search
   USPC ............. 705/7.11, 7.26, 7.27, 301, 7.12; 345/423; 707/E17.005; 715/771, 772
   See application file for complete search history.

(56) References Cited

U.S. PATENT DOCUMENTS

2004/0260591 A1* 12/2004 King .................... 705/8

OTHER PUBLICATIONS

Anderson; Callahan; Introduction to the Vistrails System; 2005.*
Kreuseler; A History Mechanism for Visual Data Mining; 2005; ISSN : 1522-404X; ISBN: 0-7803-8779-3.*
Bae; Process Mining, Discovery, and Integration using Distance Measures; 2006.*
Karen M. McCann;ScyFlow An Environment for the visual Specificaton and Execution of Scientific Workflows; 2006.*
Louis Bavoil 1 Steven P. Callahan 1 Patricia J. Crossno 3 Juliana Freire 2 Carlos E. Scheidegger 1 Cl'audio T. Silva 1,2 Huy T. Vo "VisTrails: Enabling Interactive Multiple-View Visualizations", IEEE Visualization Oct. 23-28, 2005, Minneapolis, MN, USA.*
Graph Products, printed on Jan. 16, 2013 from http://en.wikipedia.org/wiki/Graph_product.

(Continued)

Primary Examiner — Mark A Fleischer
(74) Attorney, Agent, or Firm — Bell & Manning, LLC

(57) ABSTRACT

A method of creating an analogous workflow is provided. A first workflow is received at a first device, the first workflow including a plurality of first modules that are connected. A second workflow is received at the first device, the second workflow including a plurality of second modules that are connected. A third workflow is received at the first device, the third workflow including a plurality of third modules that are connected. An analogy workflow is determined based on a difference between the received first workflow and the received second workflow. The determined analogy workflow is applied to the received third workflow to define a fourth workflow. A method of identifying a workflow of a plurality of workflows is provided. A query workflow includes a plurality of modules that are connected. A workflow is identified that at least partially matches the received query workflow.

20 Claims, 30 Drawing Sheets

(56) References Cited

OTHER PUBLICATIONS

Scheidegger et al., Querying and Creating Visualizations by Analogy, IEEE Transactions on Visualization and Computer Graphics, vol. 13, No. 6, Nov. 2, 2007, pp. 1560-1567.

Silva et al., Provenance for Visualizations: Reproducibility and Beyond, IEEE Computing in Science & Engineering, vol. 9, No. 5, Sep. 2007, pp. 82-89.

Freire et al., Managing Rapidly-Evolving Scientific Workflows, In Proceedings of the International Provenance and Annotation Workshop (IPAW), May 2006.

Callahan et al., VisTrails: Visualization meets Data Management, In Proceedings of ACM SIGMOD, Jun. 2006.

Callahan et al., Managing the Evolution of Dataflows with VisTrails, In Proceedings of IEEE Workshop on Workflow and Data Flow for Scientific Applications (SciFlow), Apr. 2006.

Scheidegger et al., Querying and Re-Using Workflows with VisTrails, SIGMOD'08, Vancouver, BC, Canada, Jun. 9, 2008.

Freire et al., VisTrails: Using Provenance to Streamline Data Exploration, in Poster Proceedings of the International Workshop on Data Integration in the Life Sciences (DILS), 2007.

Eide et al., Integrated Scientific Workflow Management for the Emulab Network Testbed, Proceedings of USENIX Annual Technical Conference, May 2006, Boston, MA.

* cited by examiner

ANALOGY BASED WORKFLOW IDENTIFICATION

CROSS-REFERENCE TO RELATED APPLICATIONS

This application claims the benefit as a divisional of U.S. patent application Ser. No. 11/697,929 that was filed Apr. 9, 2007, the disclosure of which is incorporated by reference in its entirety. U.S. patent application Ser. No. 11/697,929 claims the benefit of U.S. Provisional Patent Application Ser. No. 60/790,046 that was filed Apr. 7, 2006, the disclosure of which is incorporated by reference in its entirety.

REFERENCE TO GOVERNMENT RIGHTS

This invention was made with government support under IIS0513692 awarded by National Science Foundation. The government has certain rights in this invention.

FIELD

The field of the disclosure relates generally to data processing to create results for presentation to a user. More specifically, the disclosure relates to the use of a workflow query and/or an analogy defined between workflows to rapidly develop new data processing results based on the query and the analogy.

BACKGROUND

The volume of information has been growing at an exponential rate. Since 2003, new information generated annually exceeds the amount of information created in all previous years. Digital information now makes up more than 90% of all information produced, vastly exceeding data generated on paper and film. One of the greatest scientific and engineering challenges of the 21st century is to effectively understand and leverage this growing wealth of data. Computational processes are widely-used to analyze, understand, integrate, and transform data. For example, to understand trends in multi-dimensional data in a data warehouse, analysts generally go through an often time-consuming process of iteratively drilling down and rolling up through the different axes to find interesting 'nuggets' in the data. Often, to mine data, several algorithms are applied and results are compared, not only among different algorithms, but also among different configurations of a given algorithm. To build data warehouses and data marts that integrate data from disparate data sources within an enterprise, extraction, transformation, and loading (ETL) workflows need to be assembled to create consistent, accurate information. Additionally, to understand and to accurately model the behavior of environmental components, environmental scientists often need to create complex visualization dataflows to compare the visual representations of the actual behavior observed by sensors with the behavior predicted in simulations. Further, to improve the quality of a digital photo, a user may explore different combinations of filters. As a further example, to plan a radiation treatment, a radiation oncologist may create a large number of 3-dimensional (3-D) visualizations to find a visualization that clearly shows the lesion tissue that requires treatment.

Due to their exploratory nature, these tasks involve sometime large numbers of trial-and-error steps. In an exploratory process, users may need to select data and specify the algorithms and visualization techniques used to process and to analyze the data. The analysis specification is adjusted in an iterative process as the user generates, explores, and evaluates hypotheses associated with the information under study. To successfully analyze and validate various hypotheses, it is necessary to pose queries, correlate disparate data, and create insightful data products of both the simulated processes and observed phenomena. Before users can view and analyze results, they need to assemble and execute complex pipelines (dataflows) by selecting data sets, specifying a series of operations to be performed on the data, and creating an appropriate visual representation. As an additional factor that contributes to the complexity of these tasks, assembling the computational processes may require a combination of loosely-coupled resources, including specialized libraries, grid and Web services that may generate yet more data, adding to the overflow of information users need to process.

Workflows are emerging as a paradigm for representing and managing complex computations. Workflows can capture complex analysis processes at various levels of detail and capture the provenance information necessary for reproducibility, result publication, and result sharing among collaborators. Because of the formalism they provide and the automation they support, workflows have the potential to accelerate and to transform the information analysis process. Workflows are rapidly replacing primitive shell scripts as evidenced by the release of Automator by Apple®, Data Analysis Foundation by Microsoft®, and Scientific Data Analysis Solution by SGI®.

Often, insight comes from comparing the results of multiple visualizations created during the exploration process. For example, by applying a given visualization process to multiple datasets generated in different simulations; by varying the values of certain visualization parameters; or by applying different variations of a given process (e.g., which use different visualization algorithms) to a dataset, insight can be gained. The path from "data to insight" requires a laborious, trial-and-error process, where users assemble, iteratively modify, and execute complex workflows, which may include pipelines and/or dataflows.

In the course of exploratory studies, users often build large collections of workflows, which include, for example, different types of visualizations, each of which may help in the understanding of a different aspect of their data. For example, a user working on a new computational fluid dynamics application might need a collection of visualizations such as 3-dimensional (3-D) isosurface plots, 2-dimensional (2-D) plots with relevant quantitative information, and various direct volume rendering images. Although in general, each visualization is implemented in a separate workflow, there is a certain amount of overlap between the workflows. For example, each workflow may manipulate the same input dataset(s). Furthermore, for a particular class of visualizations, the users might generate several different versions of each individual workflow while fine tuning visualization parameters or experimenting with different data sets. Thus, constructing insightful visualizations is a laborious process that requires expertise in both visualization techniques as well as the domain of the data being explored. Therefore, what is needed is a method and a system for simplifying and semi-automating the construction of new visualizations to allow the rapid development of workflows and to reduce the need to understand both visualization techniques and the data domain.

SUMMARY

A method and a system for capturing, modeling, storing, querying, and/or interacting with provenance information for an evolutionary workflow process is provided in an exemplary embodiment. Modifications to a workflow are captured as the user generates, explores, and evaluates hypotheses associated with data under study. Abstractly, a workflow consists of modules (e.g., programs, scripts, function calls, application programming interface (API) calls, etc.) connected in a network to define a result. A dataflow is an exemplary workflow. The initial modules and the subsequent modifications are captured as actions that identify, for example, a change to a parameter value of a module in the workflow, an addition or a deletion of a module in the workflow, an addition or a deletion of a module connection in the workflow, addition or deletion of a constraint in the workflow, etc. These changes are presented in a version tree, which reflects the evolution of the evolutionary workflow process over time. The provenance information can also be used to simplify and to semi-automate the development of new results for presentation to users to aid both expert and non-expert users in performing data exploration.

In an exemplary embodiment, a device for identifying a workflow of a plurality of workflows is provided. The device includes, but is not limited to, a computer-readable medium having computer-readable instructions therein and a processor. The processor is coupled to the computer-readable medium and is configured to execute the instructions. The instructions comprise receiving a query workflow at a first device, wherein the query workflow comprises a plurality of modules, and further wherein the plurality of modules are connected; identifying a workflow of a plurality of workflows, the identified workflow at least partially matching the received query workflow; and presenting the identified workflow to a user at the first device.

A method of identifying a workflow of a plurality of workflows is provided. A query workflow is received at a first device, which includes a plurality of modules that are connected. A workflow is identified of a plurality of workflows, the identified workflow at least partially matching the received query workflow. The identified workflow is presented to a user at the first device.

In yet another exemplary embodiment, a computer-readable medium is provided. The computer-readable medium has computer-readable instructions therein that, upon execution by a processor, cause the processor to implement the operations of the method of identifying a workflow of a plurality of workflows.

In an exemplary embodiment, a device for creating an analogous workflow is provided. The device includes, but is not limited to, a computer-readable medium having computer-readable instructions therein and a processor. The processor is coupled to the computer-readable medium and is configured to execute the instructions. The instructions comprise receiving a first workflow, a second workflow, and a third workflow, determining an analogy workflow based on a difference between the received first workflow and the received second workflow, applying the determined analogy workflow to the received third workflow to define a fourth workflow, and presenting the defined fourth workflow to a user at the first device. The first workflow comprises a plurality of first modules that are connected. The second workflow comprises a plurality of second modules that are connected. The third workflow comprises a plurality of third modules, wherein the plurality of third modules are connected.

In another exemplary embodiment, a method of creating an analogous workflow is provided. A method of creating an analogous workflow is provided. A first workflow is received at a first device, the first workflow including a plurality of first modules that are connected. A second workflow is received at the first device, the second workflow including a plurality of second modules that are connected. A third workflow is received at the first device, the third workflow including a plurality of third modules that are connected. An analogy workflow is determined based on a difference between the received first workflow and the received second workflow. The determined analogy workflow is applied to the received third workflow to define a fourth workflow. The defined fourth workflow is presented to a user at the first device.

In yet another exemplary embodiment, a computer-readable medium is provided. The computer-readable medium has computer-readable instructions therein that, upon execution by a processor, cause the processor to implement the operations of the method of creating an analogous workflow.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements.

FIG. 7b depicts the user interface of the evolutionary workflow creator application of FIG. 2 displaying a second parameter exploration window indicating selection of a first interpolation method in accordance with an exemplary embodiment.

FIG. 23 depicts result presentations between analogies in accordance with an exemplary embodiment.

DETAILED DESCRIPTION

Figure 1:
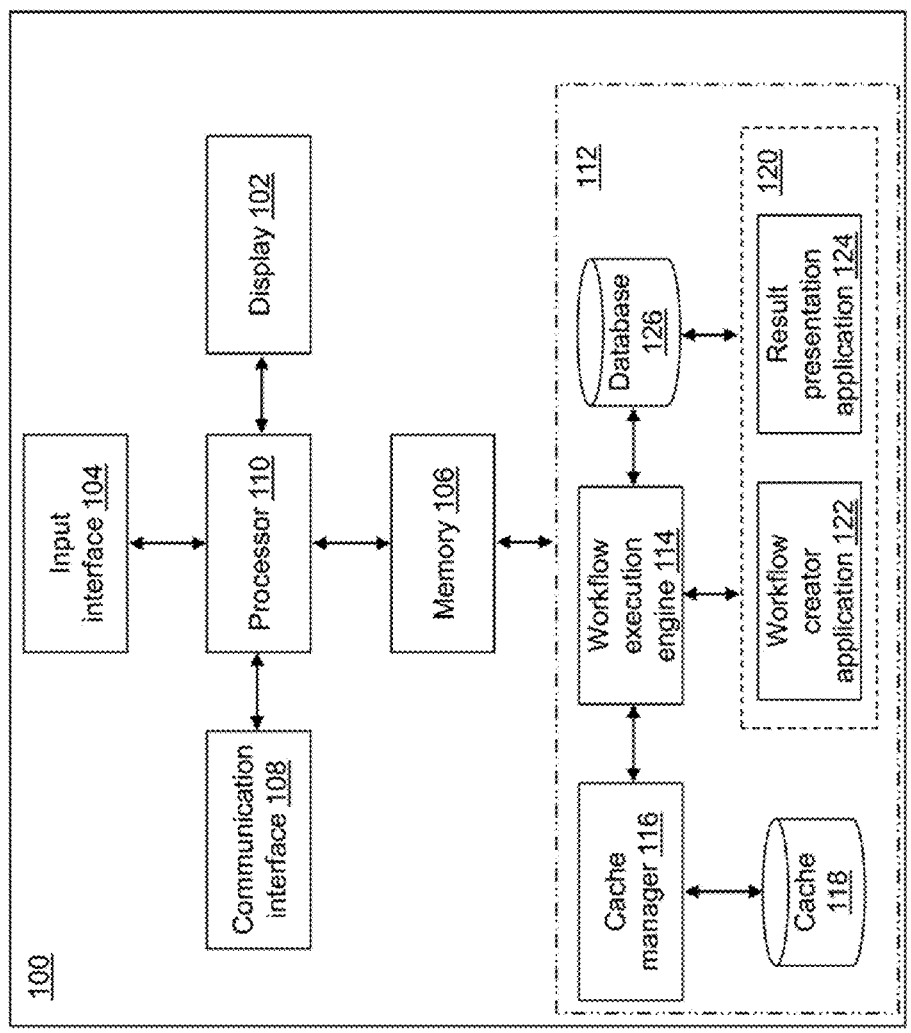
FIG. 1 depicts a block diagram of a evolutionary workflow processing system in accordance with an exemplary embodiment.

With reference to FIG. 1, a block diagram of an evolutionary workflow processing system 100 is shown in accordance with an exemplary embodiment. The components of evolutionary workflow processing system 100 may be implemented using one or more computing devices, which may be a computer of any form factor such as a laptop, a desktop, a server, etc. Evolutionary workflow processing system 100 may include a display 102, an input interface 104, a memory 106, a communication interface 108, a processor 110, and an evolutionary workflow tool 112. Different and additional components may be incorporated into evolutionary workflow processing system 100. For example, evolutionary workflow processing system 100 may include speakers for presentation of audio media content.

Display 102 presents information to a user of evolutionary workflow processing system 100 as known to those skilled in the art. For example, display 102 may be a thin film transistor display, a light emitting diode display, a liquid crystal display, or any of a variety of different displays known to those skilled in the art now or in the future.

Input interface 104 provides an interface for receiving information from the user for entry into evolutionary workflow tool 112 as known to those skilled in the art. Input interface 104 may use various input technologies including, but not limited to, a keyboard, a pen and touch screen, a mouse, a track ball, a touch screen, a keypad, one or more buttons, etc. to allow the user to enter information into evolutionary workflow tool 112 or to make selections presented in a user interface displayed on display 102 under control of evolutionary workflow tool 112. Input interface 104 may provide both an input and an output interface. For example, a touch screen both allows user input and presents output to the user.

Memory 106 is an electronic holding place or storage for information so that the information can be accessed by processor 110 as known to those skilled in the art. Evolutionary workflow processing system 100 may have one or more memories that use the same or a different memory technology. Memory technologies include, but are not limited to, any type of RAM, any type of ROM, any type of flash memory, etc. Evolutionary workflow processing system 100 also may have one or more drives that support the loading of a memory media such as a CD or DVD or ports that support connectivity with memory media such as flash drives.

Communication interface 108 provides an interface for receiving and transmitting data between devices using various protocols, transmission technologies, and media as known to those skilled in the art. The communication interface may support communication using various transmission media that may be wired or wireless. Evolutionary workflow processing system 100 may have one or more communication interfaces that use the same or different protocols, transmission technologies, and media.

Processor 110 executes instructions as known to those skilled in the art. The instructions may be carried out by a special purpose computer, logic circuits, or hardware circuits. Thus, processor 110 may be implemented in hardware, firmware, software, or any combination of these methods. The term "execution" is the process of running an application or the carrying out of the operation called for by an instruction. The instructions may be written using one or more programming language, scripting language, assembly language, etc. Processor 110 executes an instruction, meaning that it performs the operations called for by that instruction. Processor 110 operably couples with display 102, with input interface 104, with memory 106, and with communication interface 108 to receive, to send, and to process information. Processor 110 may retrieve a set of instructions from a permanent memory device and copy the instructions in an executable form to a temporary memory device that is generally some form of RAM. Evolutionary workflow processing system 100 may include a plurality of processors that use the same or a different processing technology.

Evolutionary workflow tool 112 provides an infrastructure for systematically capturing detailed provenance and streamlining the data exploration process. Evolutionary workflow tool 112 uniformly captures provenance for workflows used to create results as part of a evolutionary workflow process used to generate a final result. A result may include a Boolean value, a visualization, a table, a graph, a histogram, a numerical value, a string, etc. The result may be presented pictorially, numerically, graphically, textually, as an animation, audibly, etc. Use of evolutionary workflow tool 112 allows reproducibility of results and simplifies data exploration by allowing users to easily navigate through the space of workflows and parameter settings associated with an exploration task. Evolutionary workflow tool 112 may include a workflow execution engine 114, a cache manager 116, a cache 118, and an evolutionary workflow interaction application 120. One or more of the components of evolutionary workflow tool 112 may interact through communication interface 108 using a network such as a local area network (LAN), a wide area network (WAN), a cellular network, the Internet, etc. Thus, the components of evolutionary workflow tool 112 may be implemented at a single computing device or a plurality of computing devices in a single location, in a single facility, and/or may be remote from one another.

Evolutionary workflow tool 112 provides a graphical user interface for creating, editing, executing, and querying workflows and for capturing a full provenance of the exploration process defined as part of an evolutionary workflow process. As a user first creates an initial workflow and then makes modifications to define additional workflows, a capture mechanism records the modifications. Thus, instead of storing a set of related workflows, the operations or changes that are applied to create a series of workflows, such as the addition of a module, the modification of a parameter, etc. are stored. Such a representation uses substantially less space than storing multiple versions of a workflow and enables the construction of an intuitive interface that allows the user to understand and to interact with the evolution of the workflow through these changes.

Workflow execution engine 114 may be invoked by a user of evolutionary workflow interaction application 120. Workflow execution engine 114 receives a workflow as an input from evolutionary workflow interaction application 120 and executes the received workflow. Workflow execution engine 114 executes the operations defined by the received workflow by invoking the appropriate functions. The functions may be invoked from a plurality of sources, including libraries, visualization APIs, and script APIs. In general, the workflow manipulates one or more data files that contain the data for processing and that may be stored in a database 126. A plurality of evolutionary workflow files may be organized in database 126 which may include a structured query language (SQL) database. The database may be organized into multiple databases to improve data management and access. The multiple databases may be organized into tiers. Additionally, database 126 may include a file system including a plurality of data files. Database 126 may further be accessed by remote users using communication interface 108. Remote users may checkout and checkin data and/or files from database 126 as known to those skilled in the art.

Cache manager 116 controls workflow execution keeping track of operations that are invoked and their respective parameters. Only new combinations of operations and parameters are requested from workflow execution engine 114. Cache manager 116 scheduled the execution of modules in a workflow execution performed by workflow execution engine 114. Cache manager 116 determines data dependencies among the modules associated with the received workflow and substitutes a call to access data from a results cache to a call to access data from cache 118 based on the determined data dependencies and identification of common intermediate results generated during execution of the workflow. As the workflow is executed, cache manager 116 stores the results of one or more of the modules. For example, a module name and parameter values together with a handle to the output results may be stored. Cache manager 116 performs a cache lookup from cache 118 based on the determined data dependencies during a workflow execution process to avoid redundant processing of overlapping sequences in multiple workflows. Caching is especially useful while exploring multiple results. When variations of the same workflow need to be executed, a substantial improvement in execution time can be obtained by caching the results of overlapping subsequences of the workflows. Cache 118 is implemented using a type of memory.

Figure 2:
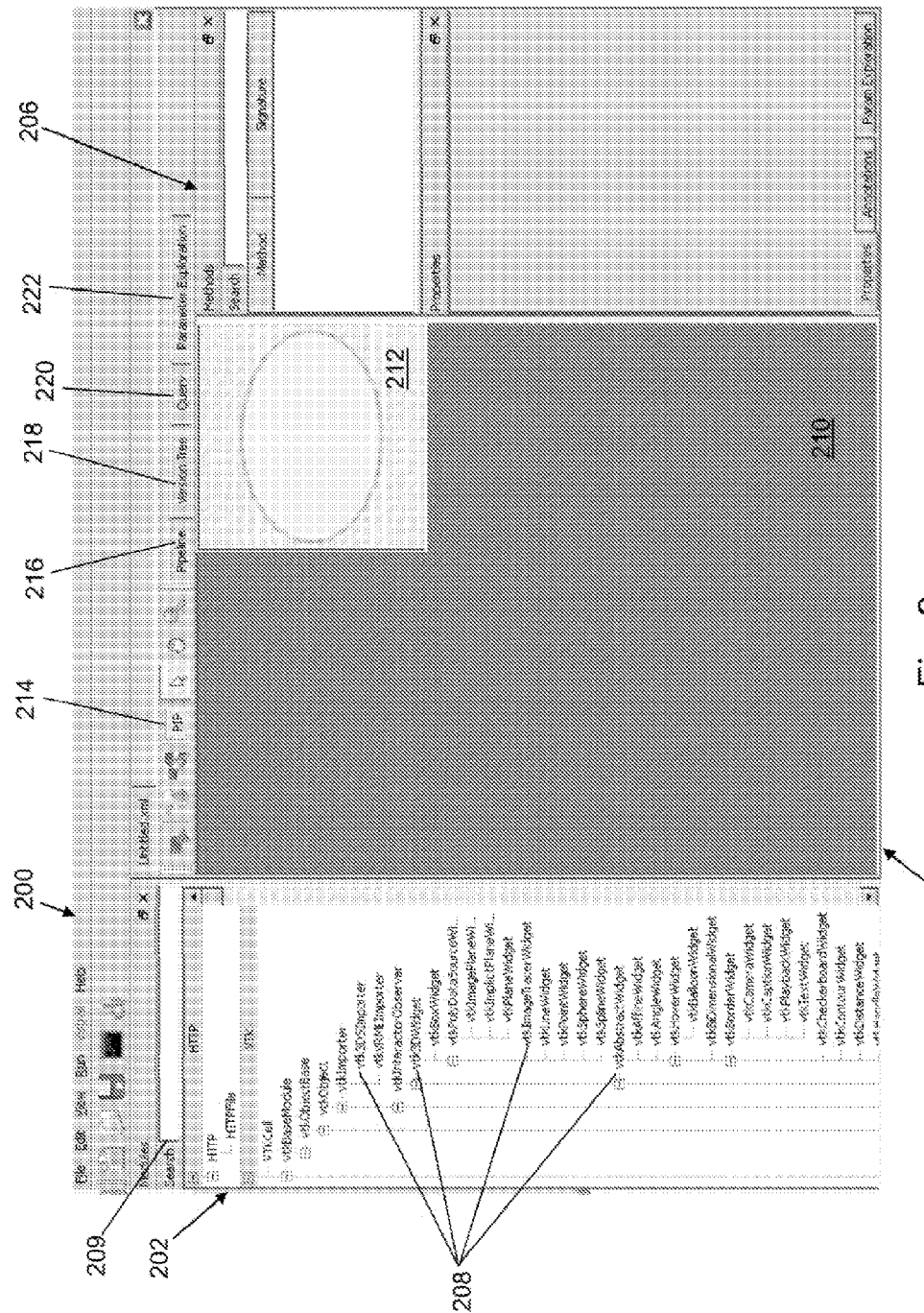
FIG. 2 depicts a user interface of a evolutionary workflow creator application in accordance with an exemplary embodiment.

Evolutionary workflow interaction application 120 may include a workflow creator application 122 and a result presentation application 124. For example, user interface windows associated with workflow creator application 122 and a result presentation application 124 may be opened together. With reference to FIG. 2, a user interface 200 of workflow creator application 122 is shown in accordance with an exemplary embodiment. User interface 200 includes a module selection region 202, a workflow interaction region 204, and a menu region 206. Module selection region 202 may include a list of modules 208 that can be used to build a workflow and a search text box 209 that can be used to locate a specific module to be included in a workflow. User entry of a module name in search text box 209 causes the corresponding module to be presented in the list of modules 208. The list of modules 208 may be presented in a tree view based on a class structure hierarchy. Workflow interaction region 204 may include a workflow area 210 and a picture-in-picture (PIP) area 212. PIP area 212 may be removed by user selection of a PIP button 214 which toggles the display of PIP area 212 on and off. Items presented in workflow area 210 are controlled based on user selection of a workflow tab 216, a version tree tab 218, a query tab 220, and a parameter exploration tab 220. Items presented in menu region 206 are controlled based on the item selected for display in workflow area 210. In the exemplary embodiment of FIG. 2, user interface 200 is shown with an empty workflow interaction region 204 because no evolutionary workflow process has been opened from an existing data file or has been created.

Figure 3:
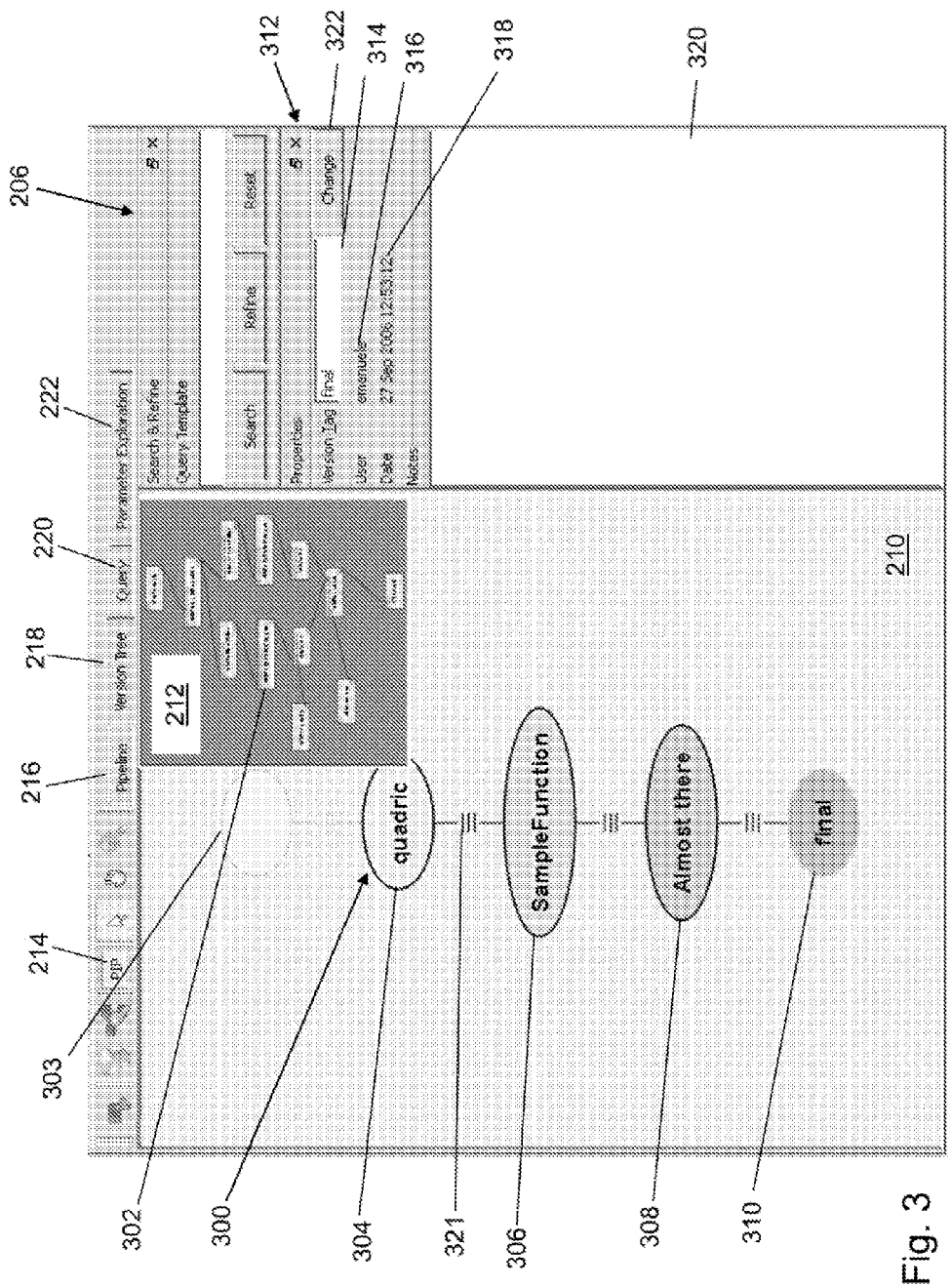
FIG. 3 depicts the user interface of the evolutionary workflow creator application of FIG. 2 displaying a version tree in accordance with an exemplary embodiment.

The stored provenance consists of one or more change actions applied to a workflow. The provenance is represented as a rooted version tree, where each node corresponds to a version of a workflow and where edges between nodes correspond to the action applied to create one from the other. The version tree reflects the process followed by the user to construct and to explore workflows as part of the evolutionary workflow process and to concisely represent all the workflow versions explored. With reference to FIG. 3, workflow area 210 includes a version tree 300, and PIP area 212 includes a workflow diagram 302 based on user selection of version tree tab 218. In the exemplary embodiment of FIG. 3, user interface 200 is shown with a version tree in workflow interaction region 204 after user selection of an existing node in the version tree. Version tree diagram 300 indicates a parent-child relationship between an empty workflow 303 and a first workflow 304, a parent-child relationship between first workflow 304 and a second workflow 306, a parent-child relationship between second workflow 306 and a third workflow 308, and a parent-child relationship between third workflow 308 and a fourth workflow 310. First workflow 304 is indicated as an oval which includes a name associated with first workflow 304 and a line which connects first workflow 304 to second workflow 306. The line indicates that first workflow 304 is a parent of second workflow 306. Similarly, second workflow 306 is indicated as an oval which includes a name associated with second workflow 306 and a line which connects second workflow 306 to third workflow 308. The line indicates that second workflow 306 is a parent of third workflow 308. Third workflow 308 is indicated as an oval which includes a name associated with third workflow 308 and a line which connects third workflow 308 to fourth workflow 310. The line indicates that third workflow 308 is a parent of fourth workflow 310.

The user optionally may show all nodes in the version tree or may only show nodes that have been named or tagged. A connection between named nodes may be represented in different ways. For example, a connection may be indicated with three perpendicular lines crossing the connection line to represent that a plurality of actions are performed to create the child. A connection without the three perpendicular lines may indicate that a single action is performed to create the child.

In the exemplary embodiment of FIG. 3, fourth workflow 310 is highlighted to indicate selection by the user. As a result, workflow diagram 302 includes a workflow diagram of fourth workflow 310. Additionally, a provenance summary area 312 includes a workflow name textbox 314 for fourth workflow 310, an author text field 316, a creation date text field 318, and a notes text area 320. The provenance summary information may be captured as metadata. The user can change the name of fourth workflow 310 by entering a new name in workflow name textbox 314 and selecting a "change" button 322. The new name is presented in the oval associated with fourth workflow 310 and is updated in database 126 to capture the version tree.

Figure 4:
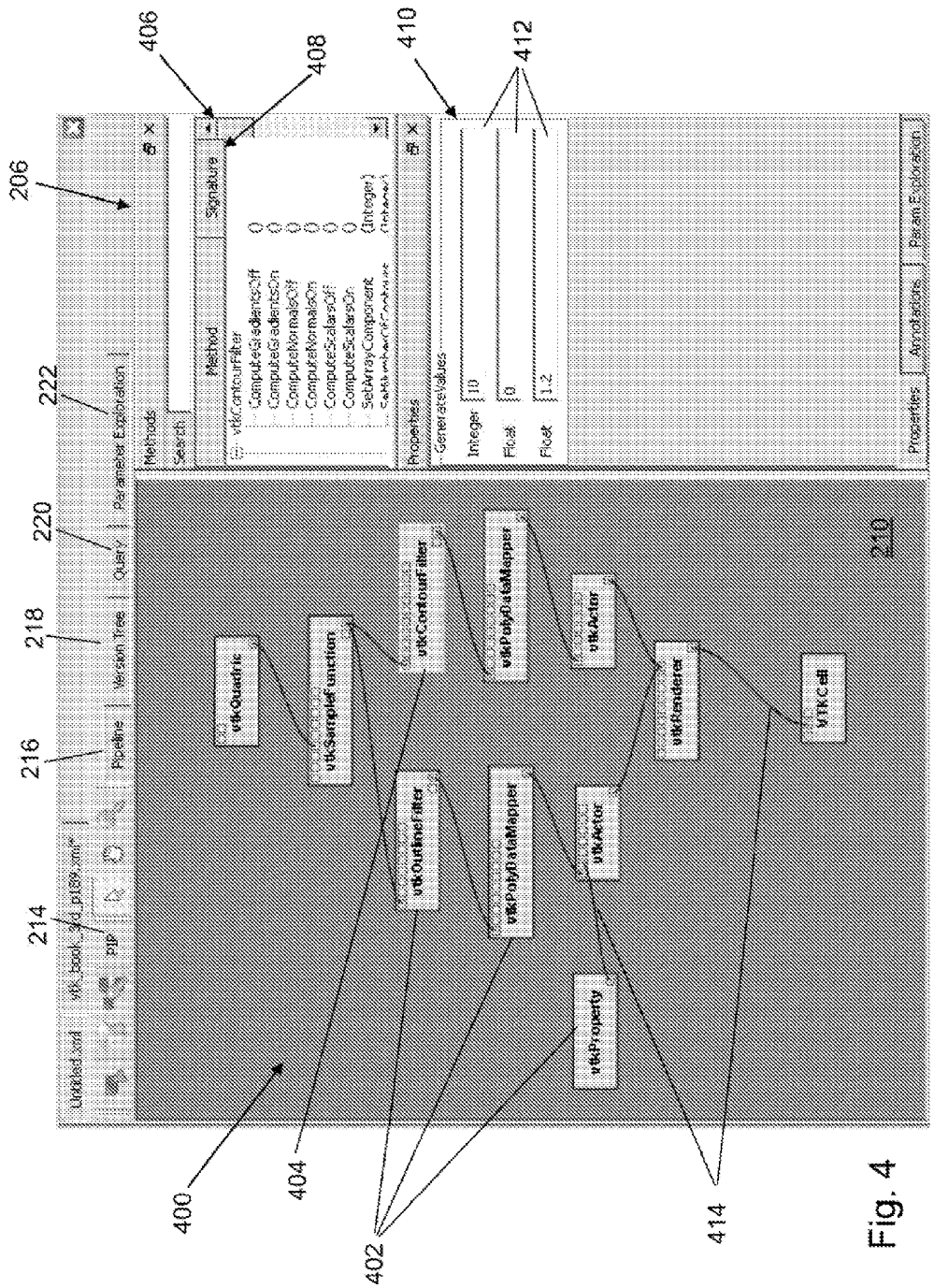
FIG. 4 depicts the user interface of the evolutionary workflow creator application of FIG. 2 displaying a workflow in accordance with an exemplary embodiment.

With reference to FIG. 4, workflow area 210 includes a first workflow diagram 400 based on user selection of workflow tab 216. The workflow associated with the selected oval in version tree diagram 302 is presented. In this mode, workflow area 210 is used to create and edit workflows. A nodes-and-connections paradigm or pipeline view associated with workflow systems is used to present the workflow to the user. First workflow diagram 400 includes a plurality of nodes 402. Each node is associated with a module that executes a function which includes instructions executed as part of the execution of the workflow to form a data product. A node can be repositioned by dragging it to the desired location of workflow area 210. When a node associated with a module is selected, the node is highlighted and the parameters associated with the selected module are shown in the right panel. In the exemplary embodiment of FIG. 4, a selected module 404 titled "vtkContourFilter" is selected and shown as highlighted. The parameters of selected module 404 are shown in a parameters area 406. Parameters area 406 includes a method grid 408 and a parameter area 410. Method grid 408 includes a list of the methods associated with selected module 404 and a signature of each method. All of the methods that can set module parameters for selected module 404 are listed in method grid 408. A user selects a method from method grid 408. Parameter area 410 displays a plurality of parameters 412 which can be defined by the user using the selected method. Associated with each of the plurality of parameters 412 is a label, which indicates the parameter input type and a text box for editing the parameter. Initially, default values are shown in the text boxes. To select a method, the user may drag the method to parameter area 410. Alternatively, the user may select the method from method grid 410 which causes the display of the parameters in parameter area 410. When a module is changed, a new workflow with the changed parameters is added to version tree 302 automatically.

A workflow is created by dragging one or more modules from module selection region 202 to workflow area 210. The plurality of nodes 402 are connected with lines 414 that represent the workflow connections through the modules. Modules can be connected or disconnected and added or deleted from a workflow. The line connecting each of the modules starts and ends in a small box at the top or bottom of the node representing a module. To disconnect modules, the user selects the connection line and selects delete. To connect two modules, the user places the cursor over a small box in the lower right corner of a first node corresponding to an output port, clicks the mouse, and holds down the mouse button while dragging the cursor from the first node to an input port of the second node. A connection line appears. In the exemplary embodiment of FIG. 4, input ports to a module are shown in the upper left corner of each node as small squares and output ports are shown in the lower right corner of each node as small squares. Each node may have zero, one, or more input ports and zero, one, or more output ports depending on the functionality provided by the module. The input ports of the module only accept connections from correct output ports. Dropping a connection on a module causes it to snap to the most appropriate port. However, when a module accepts multiple ports of the same type, proper connectivity is achieved by starting the connection at the module with multiple ports of the same type and by dragging the mouse to the appropriate endpoint. To determine the port to start at, hovering the mouse cursor over a port causes presentation of a small note which includes information about the port in question.

Figure 5:
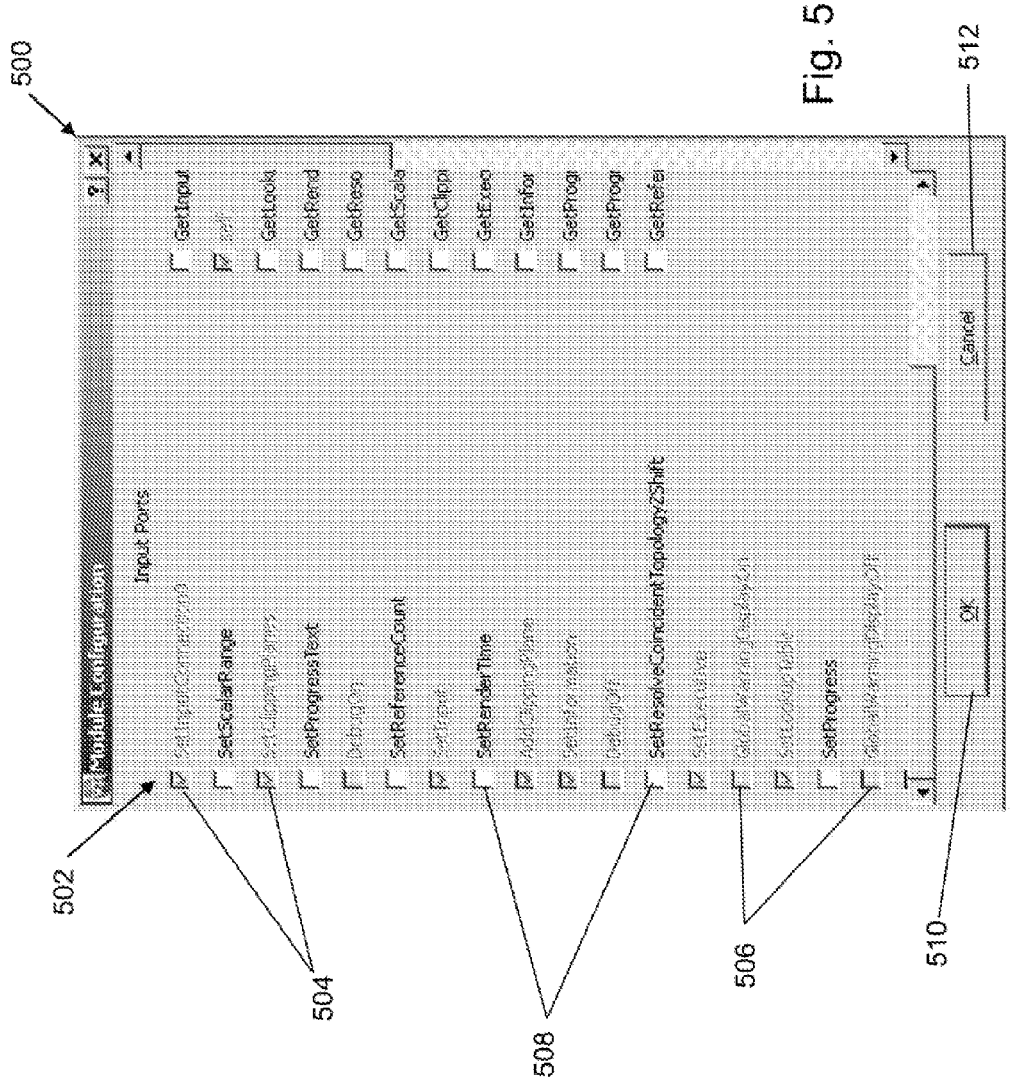
FIG. 5 depicts a second user interface of the evolutionary workflow creator application of FIG. 2 displaying an input port selection window in accordance with an exemplary embodiment.
Figure 6:
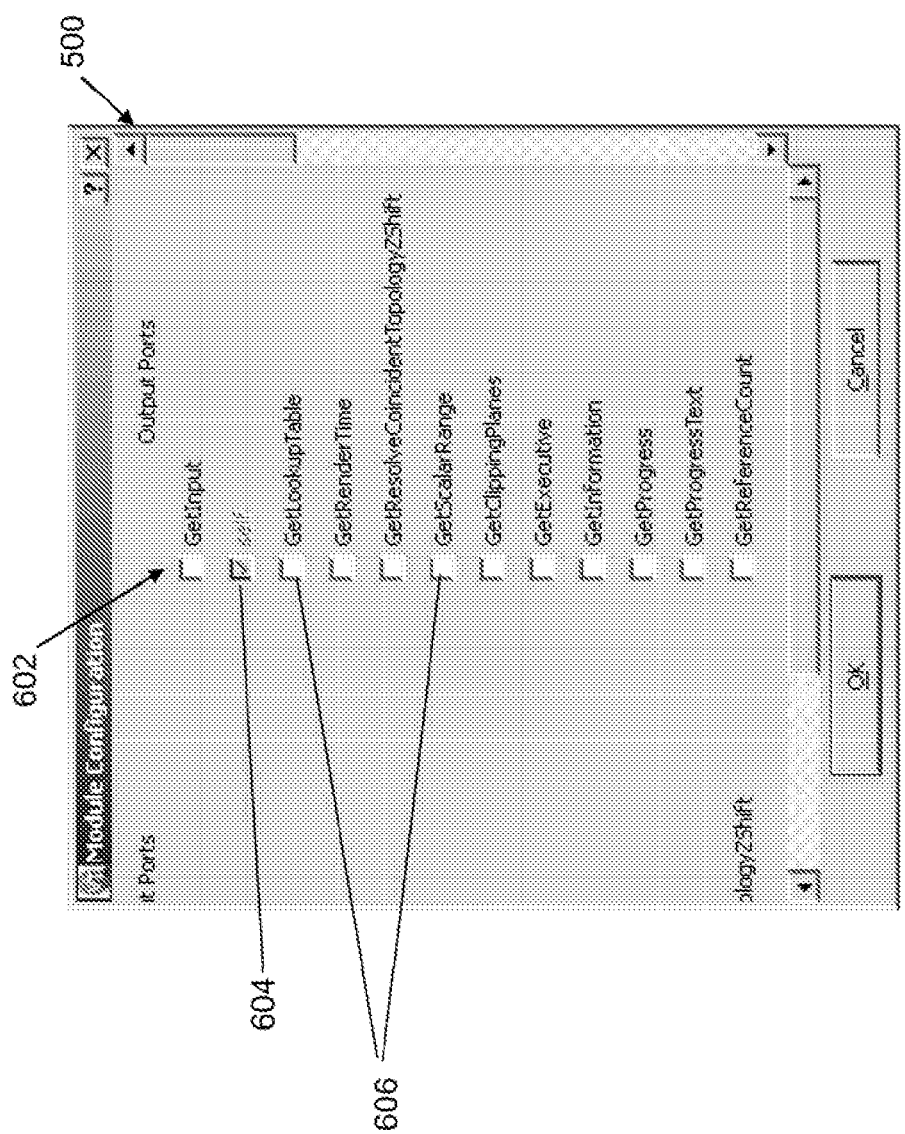
FIG. 6 depicts a second user interface of the evolutionary workflow creator application of FIG. 2 displaying an output port selection window in accordance with an exemplary embodiment.

Input and/or output ports can be added to a module. With reference to FIGS. 5 and 6, a port user interface window 500 is shown in accordance with an exemplary embodiment. A plurality of input methods 502 associated with available input ports is shown. Pre-selected methods 504 of the plurality of input methods 502 are indicated with a pre-selected checkbox and with gray lettering. Pre-selected methods 504 are included as available ports for the module by default. Unavailable methods 506 of the plurality of input methods 502 are indicated with a de-selected checkbox and with gray lettering. Unavailable methods 506 are not available for selection for the module. Available methods 508 of the plurality of input methods 502 are indicated with an empty checkbox and with black lettering. A user adds an input port by selecting the appropriate method from the available methods 508. After selection of the appropriate method, the user selects an "OK" button 510 to add the port to the selected node or a "Cancel" button 512 to cancel the addition of a port to the selected node.

With reference to FIG. 6, a plurality of output methods 602 associated with available output ports is shown. A pre-selected method 604 of the plurality of output methods 602 is indicated with a pre-selected checkbox and with gray lettering. Pre-selected method 604 is included as an available port for the module by default. Available output methods 606 of the plurality of output methods 602 are indicated with an empty checkbox and with black lettering. A user adds an output port by selecting the appropriate method from the available output methods 606.

Figure 7A:
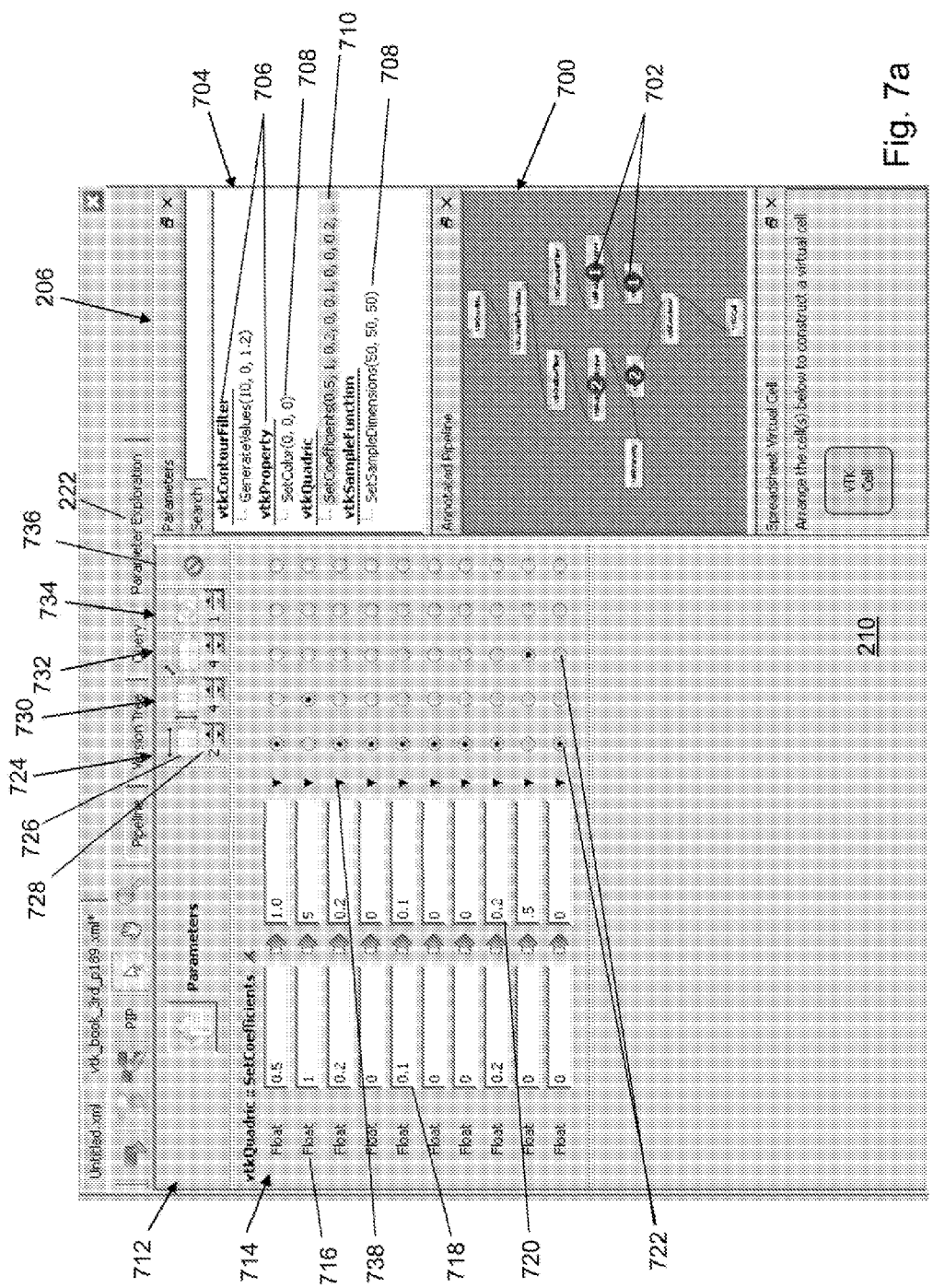
FIG. 7a depicts the user interface of the evolutionary workflow creator application of FIG. 2 displaying a first parameter exploration window in accordance with an exemplary embodiment.

With reference to FIG. 7a, workflow area 210 includes a parameter exploration area 712 based on user selection of parameter exploration tab 222. An annotated workflow is shown in a workflow area 700 similar to the workflow presented in workflow area 210. The presented workflow is the workflow associated with the selected oval in version tree diagram 302. The data flow shown in workflow area 700 includes identifiers 702 which indicate modules capable of modification to perform parameter exploration included in the selected workflow. A module area 704 lists the modules indicated with identifiers 702 in workflow area 700. The name 706 of each module is followed by a list of method names 708 which include parameters that can be explored. The default values of the parameters are indicated after the respective method name. User selection of selected method 710 is indicated by highlighting. The user may select a method by dragging the method into parameter exploration area 712. The parameters of the method are presented in a parameter grid 714 which includes each parameter which can be parameterized. Associated with each parameter of parameter grid 714 is a data type text field 716, a start value text box 718, an end value text box 720, and a plurality of dimension selector buttons 722. The plurality of dimension selector buttons 722 are included for selected method 710 because a plurality of parameters can be used to perform the parameter exploration. In some cases, a single parameter may be presented with a number of steps value that can be defined by the user. In addition, general functions can be defined that produce a set of values.

A dimension is associated with each of the plurality of dimension selector buttons 722. Because a plurality of data products are created during execution of the parameter exploration process, the user can select which parameterization is presented in either a column dimension 724, a row dimension 730, a sheet dimension 732, or a time dimension 734 within a cell of a data product spreadsheet. For each dimension, an indicator 726 indicates the dimension graphically and a number of steps value 728 indicates the number of steps to be taken between a start value selected for the parameter by the user and an end value selected for the parameter by the user in the respective start value text box 718 and end value text box 720. The user can modify the number of steps value 728 associated with each of the plurality of dimension selector buttons 722 to cause repetition of the execution of the workflow for values for the parameter from the start value to the end value in the selected number of steps. The user may optionally select an ignore button 736 to leave the associated parameter out of the exploration.

Figure 7B:
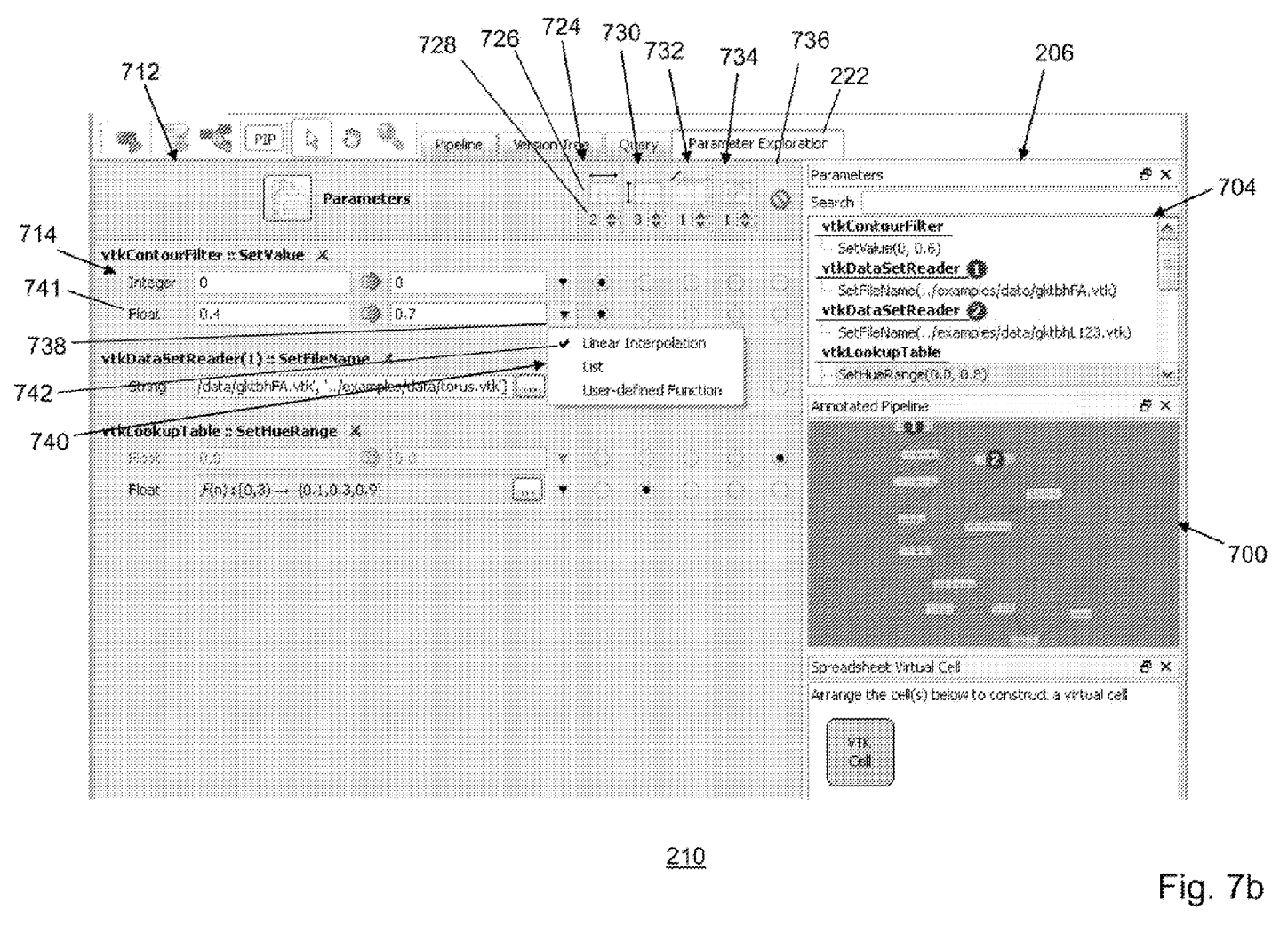

The user may also select a method for defining each value of the parameter as part of the parameter exploration process by selecting an interpolation button 738 associated with each parameter of parameter grid 714. With reference to FIG. 7b, an interpolation selection window 740 is shown in response to user selection of interpolation button 738 associated with a first parameter 741. In the exemplary embodiment of FIG. 7b, interpolation selection window 740 indicates selection of a linear interpolation 742 by the user with a check mark. As a result, in performing the parameter exploration in the dimension selected for first parameter 741, the parameter used for each parameter exploration is determined using a linear interpolation between the start value and the end value.

Figure 7C:
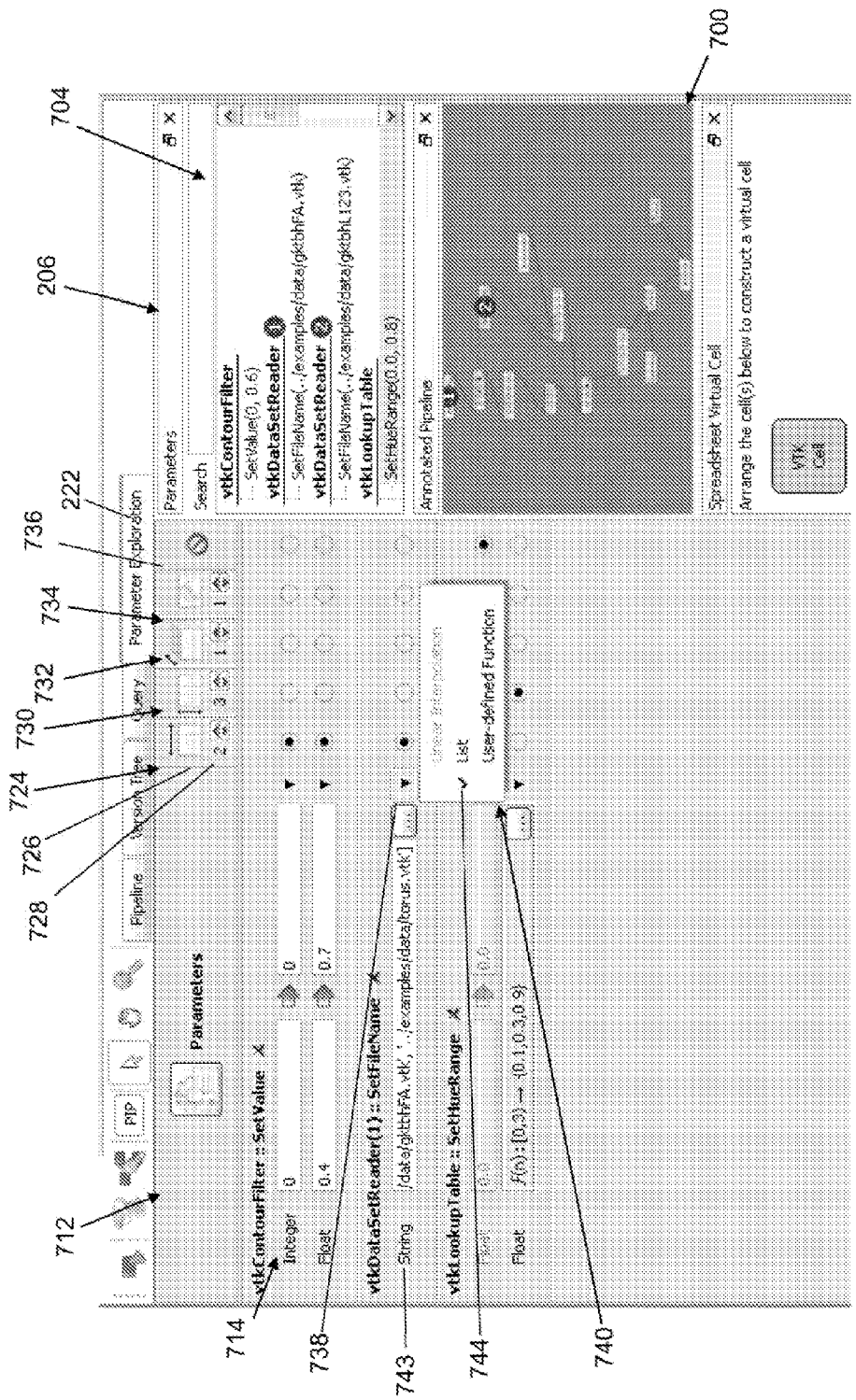
FIG. 7c depicts the user interface of the evolutionary workflow creator application of FIG. 2 displaying a second parameter exploration window indicating selection of a second interpolation method in accordance with an exemplary embodiment.

With reference to FIG. 7c, interpolation selection window 740 is shown in response to user selection of interpolation button 738 associated with a second parameter 743. In the exemplary embodiment of FIG. 7c, interpolation selection window 740 indicates selection of a list 744 by the user with a check mark. As a result, in performing the parameter exploration in the dimension selected for second parameter 743, the parameter used for each parameter exploration is determined using a list provided by the user.

Figure 7D:
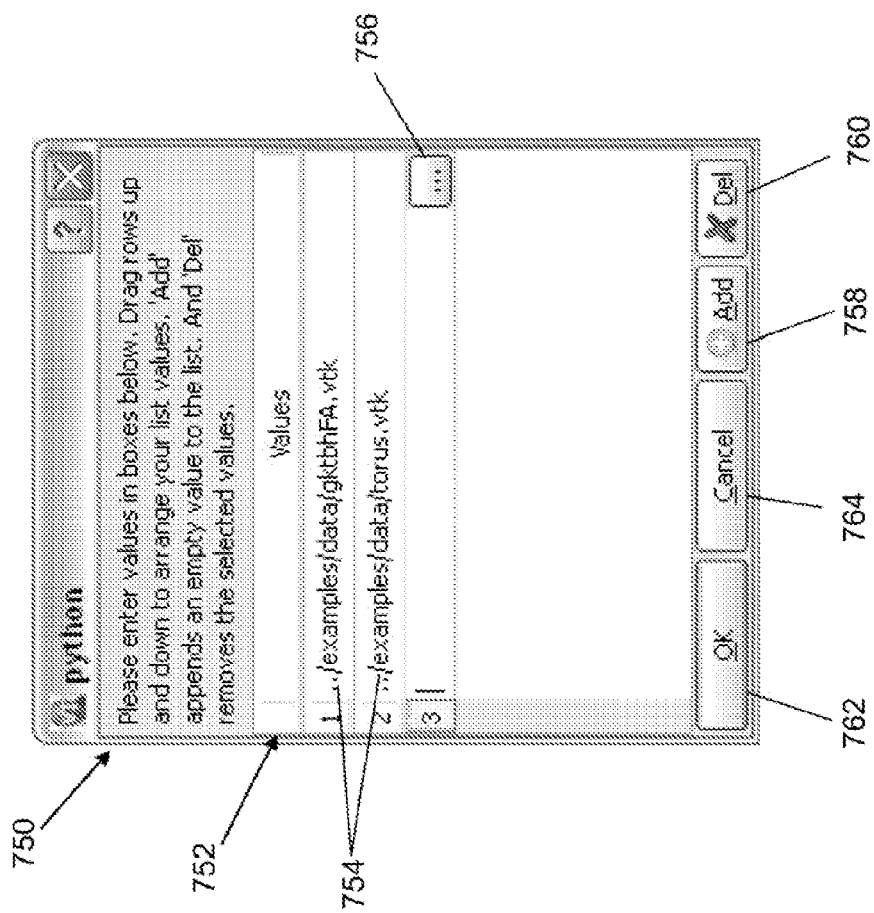
FIG. 7d depicts a first user definition window of the evolutionary workflow creator application of FIG. 2 which allows a user to define a list of parameters in accordance with an exemplary embodiment.

With reference to FIG. 7d, a list definition window 750 is shown in accordance with an exemplary embodiment. List definition window 750 includes a value grid 752 which includes a list of values 754. In the exemplary embodiment, of FIG. 7c, second parameter 743 is a file so the list of values 754 are strings which define a filename. A "browse" button 756 allows the user to browse the file system to identify the file instead of typing the filename into the appropriate cell of value grid 752. User selection of an add button 758 appends an empty value to the list of values 754. User selection of a delete button 760 deletes a selected value from the list of values 754. User selection of an "OK" button 762 saves the list of values 754 and closes list definition window 750. User selection of a cancel button 762 closes list definition window 750 without saving the list of values 754.

Figure 7E:
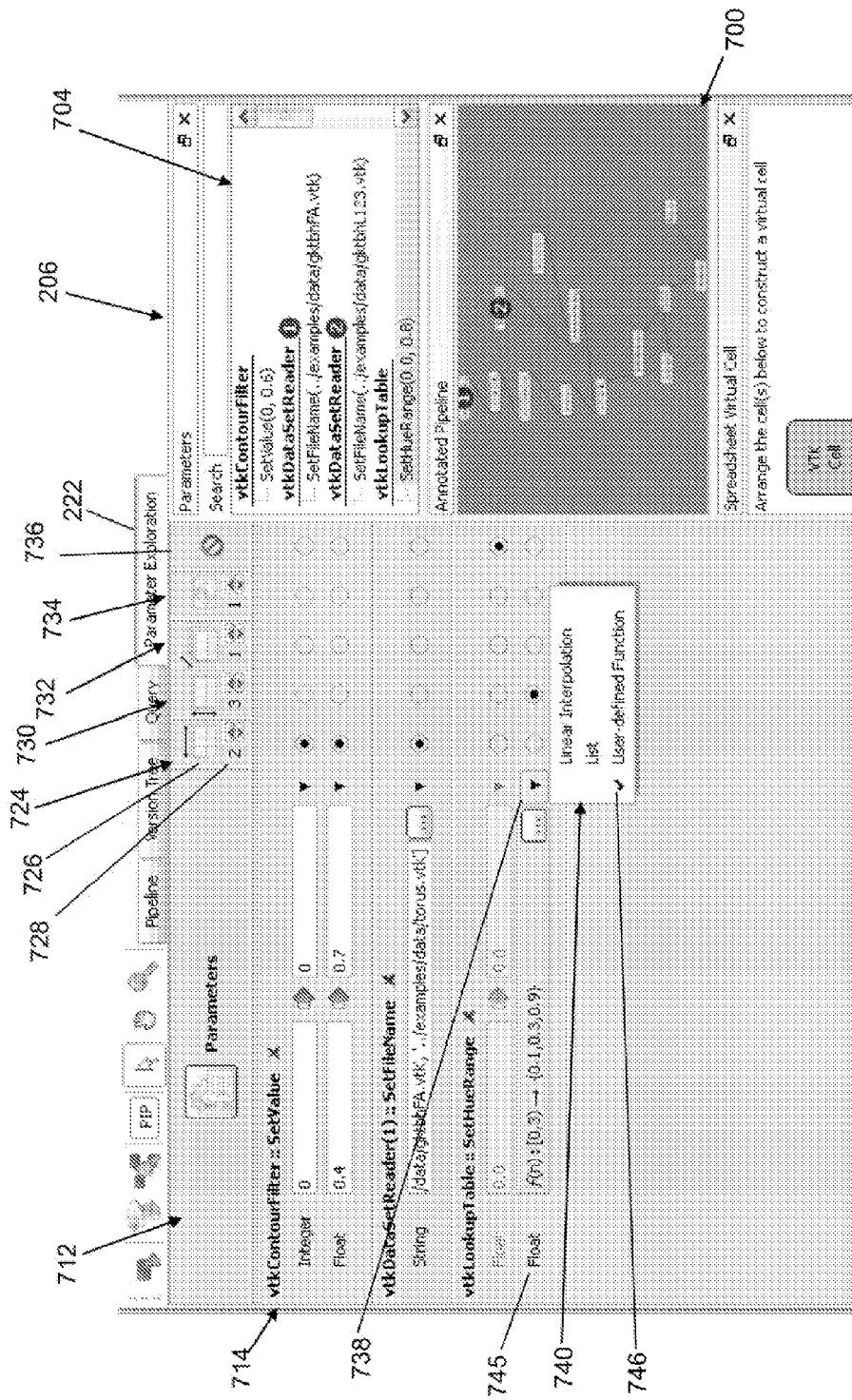
FIG. 7e depicts the user interface of the evolutionary workflow creator application of FIG. 2 displaying a second parameter exploration window indicating selection of a third interpolation method in accordance with an exemplary embodiment.

With reference to FIG. 7e, interpolation selection window 740 is shown in response to user selection of interpolation button 738 associated with a third parameter 745. In the exemplary embodiment of FIG. 7e, interpolation selection window 740 indicates selection of a user-defined function 746 by the user with a check mark. As a result, in performing the parameter exploration in the dimension selected for third parameter 745, the parameter used for each parameter exploration is determined using user-defined function 746. User-defined function 746 may be any function such as a polynomial, a random number generator, etc.

Figure 7F:
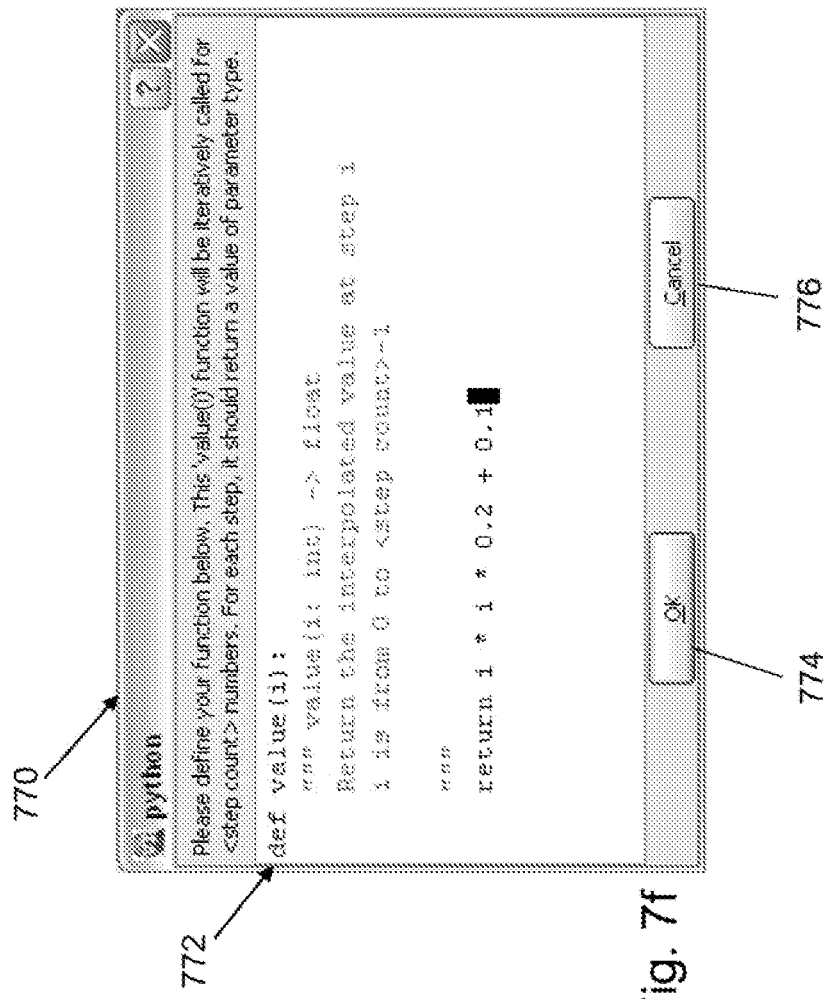
FIG. 7*f* depicts a second user definition window of the evolutionary workflow creator application of FIG. 2 which allows a user to define a function for determining values for a parameter in accordance with an exemplary embodiment.

With reference to FIG. 7f, a function definition window 770 is shown in accordance with an exemplary embodiment. Function definition window 770 includes a text entry area 772. The user creates a function in text entry area 772. The function is iteratively called for each step to determine a next parameter value. User selection of an "OK" button 774 saves the function definition and closes function definition window 770. User selection of a cancel button 776 closes function definition window 770 without saving the function definition.

Figure 8:
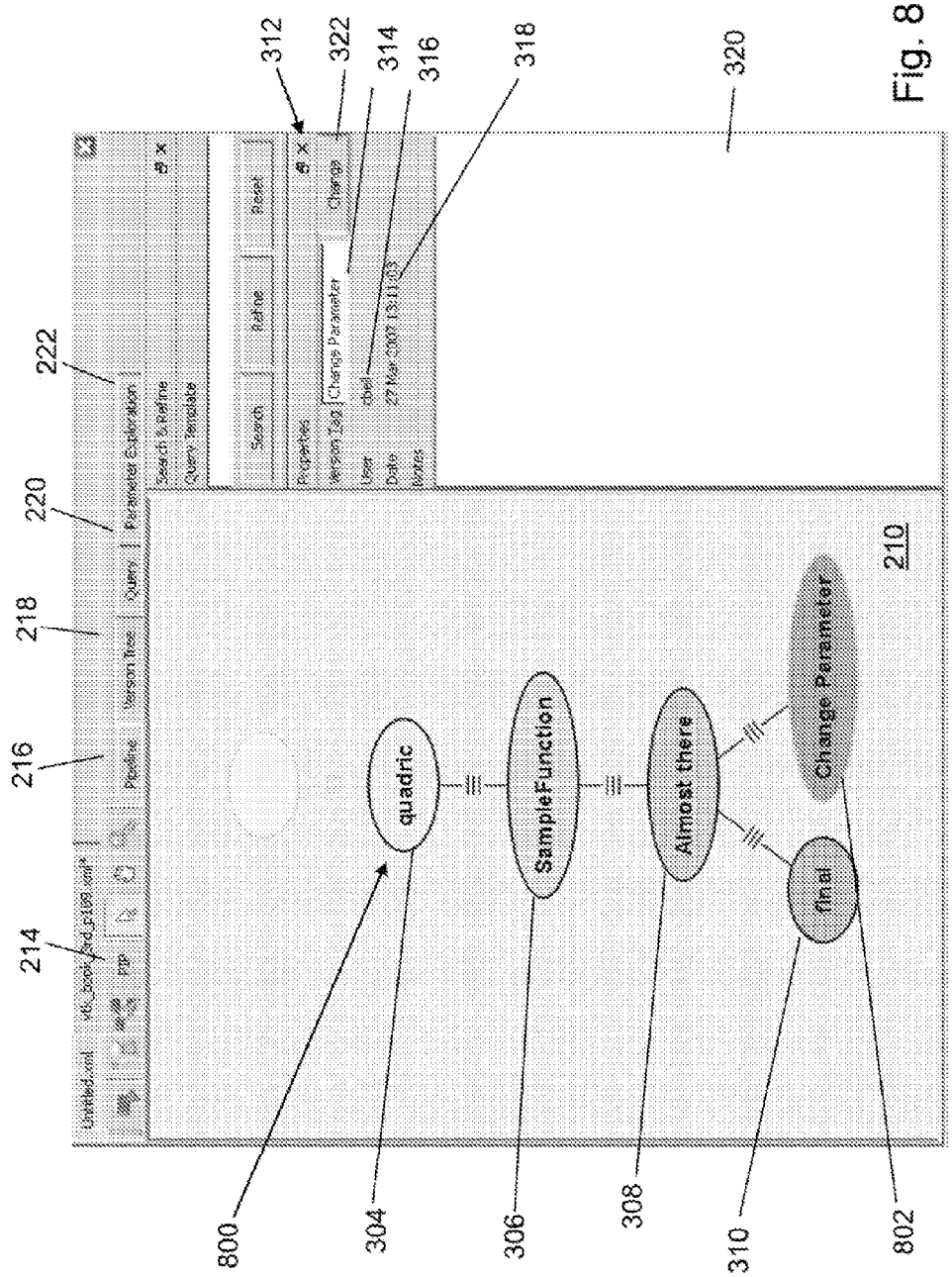
FIG. 8 depicts the user interface of the evolutionary workflow creator application of FIG. 2 displaying a second version tree in accordance with an exemplary embodiment.

With reference to FIG. 8, workflow area 210 includes a version tree 800 which includes a fifth workflow 802 created by modifying a parameter of a module of third workflow 308. Provenance summary area 312 includes workflow name textbox 314 with data associated with fifth workflow 802, author text field 316 associated with fifth workflow 802, creation date text field 318 associated with fifth workflow 802, and notes text area 320 associated with fifth workflow 802. Fifth workflow 802 is created automatically if the user modifies an existing workflow by changing a parameter, adding or deleting a module, changing a connectivity between modules, etc.

Figure 9:
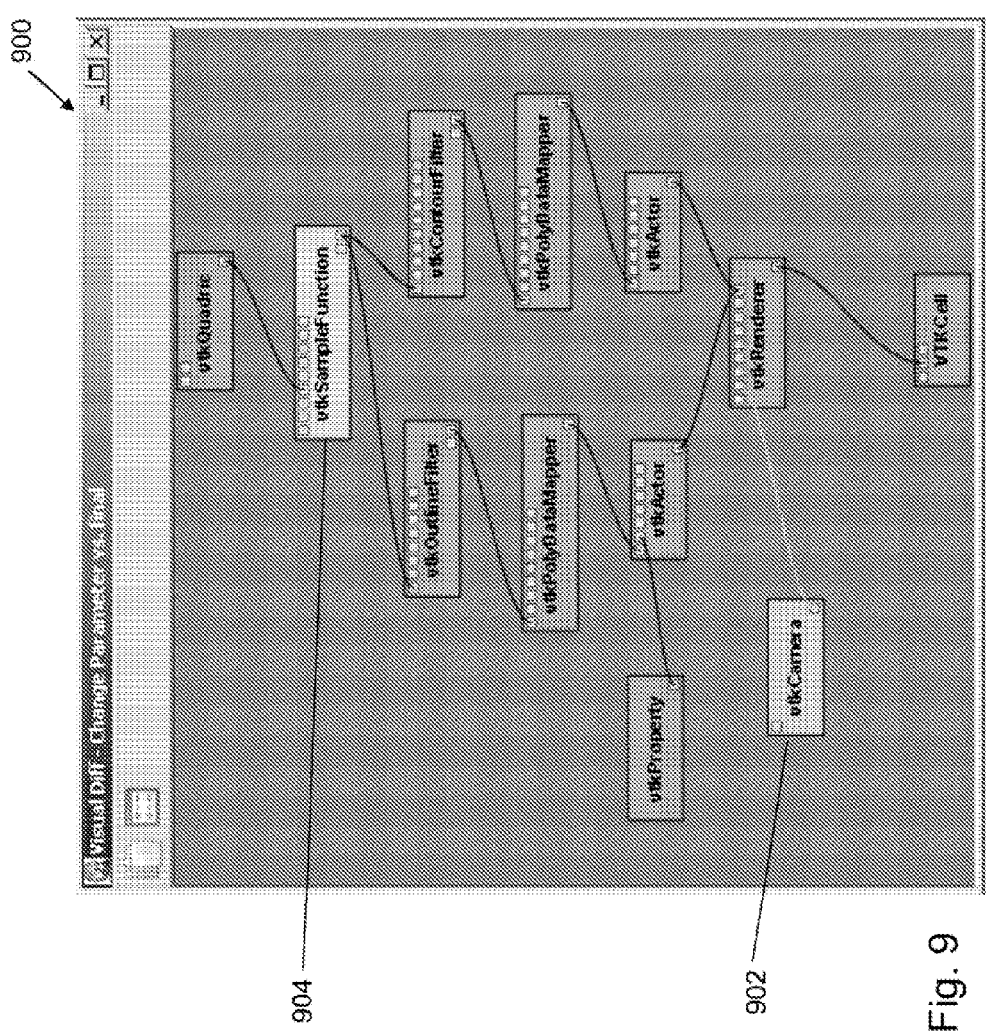
FIG. 9 depicts the user interface of the evolutionary workflow creator application of FIG. 2 displaying a visual workflow difference window in accordance with an exemplary embodiment.

With reference to FIG. 9, a workflow difference window 900 is shown in accordance with an exemplary embodiment. Workflows can be compared, for example, by a user selecting an oval of a workflow from version tree 300, dragging the selected oval to a second oval of a workflow to which to compare the workflow, and releasing the selected oval. Workflow difference window 900 shows modules that were modified between any two workflows in version tree 300. For example, unique modules may be indicated in a first color if the module was added and in a second color if the module was deleted. Modules having different parameter values may be shown in a third color, shaded differently, outlined differently, with different text coloring, etc. In the exemplary embodiment of workflow difference window 900, a first node 902 indicates that a module titled "vtkCamera" is added to the second workflow and a second node 904 indicates that a parameter of a module titled "vtkSample Function" is different for the second workflow. The remaining nodes are identical.

Figure 10:
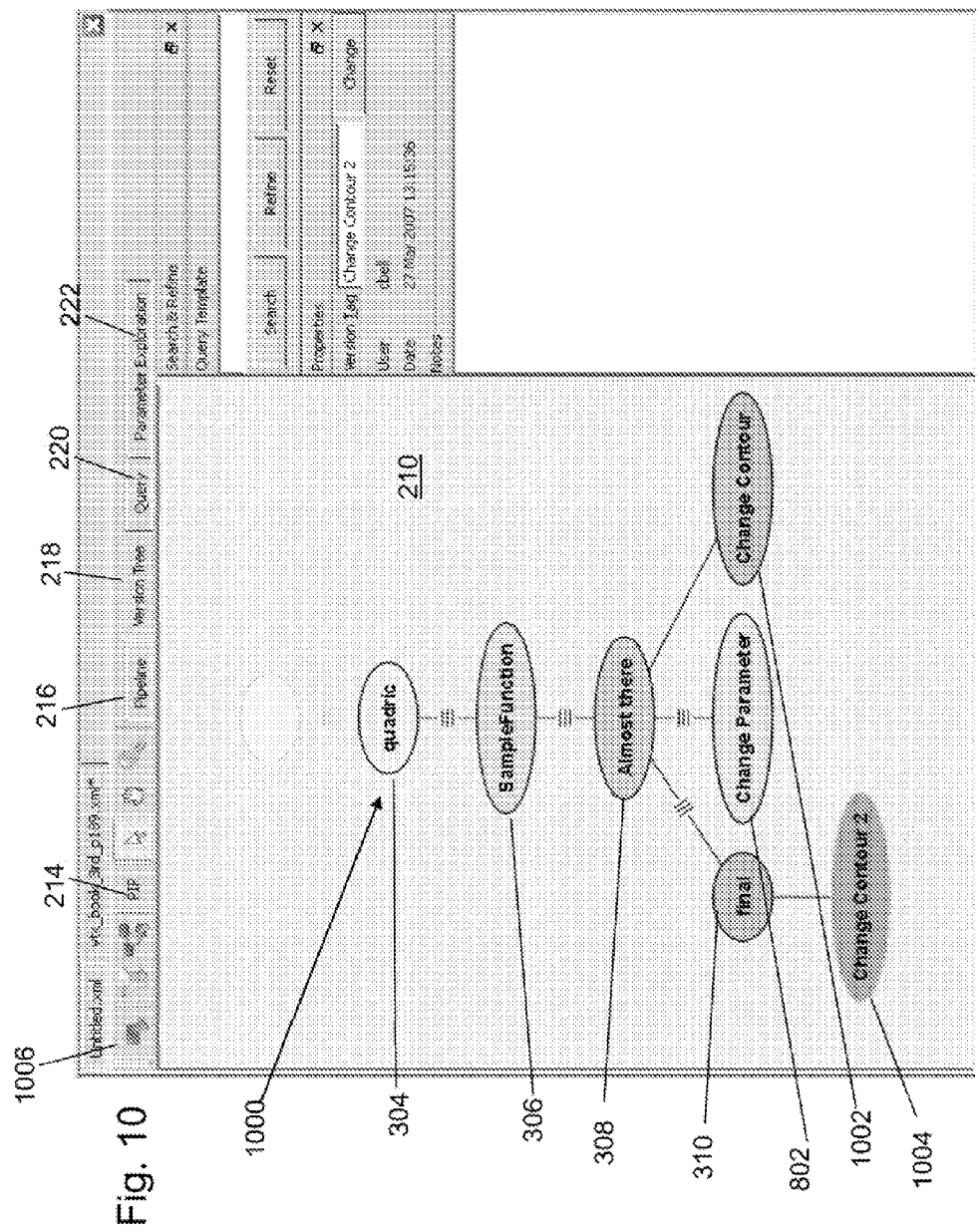
FIG. 10 depicts the user interface of the evolutionary workflow creator application of FIG. 2 displaying a third version tree in accordance with an exemplary embodiment.

With reference to FIG. 10, workflow area 210 includes a version tree 1000 which includes a sixth workflow 1002 created by modifying a parameter of a module of third workflow 308 and a seventh workflow 1004 created by modifying a parameter of a module of fourth workflow 310. The author and usage frequency can be indicated in version tree 1000 using a color and/or shading scheme. For example, workflows developed by a first user may be indicated with a first color and workflows developed by a second user may be indicated with a second color. The saturation level of the color may indicate how recently a workflow has been created or executed. A workflow can be executed by selecting the workflow from version tree 1000 and selecting an execute button 1006.

Figure 11:
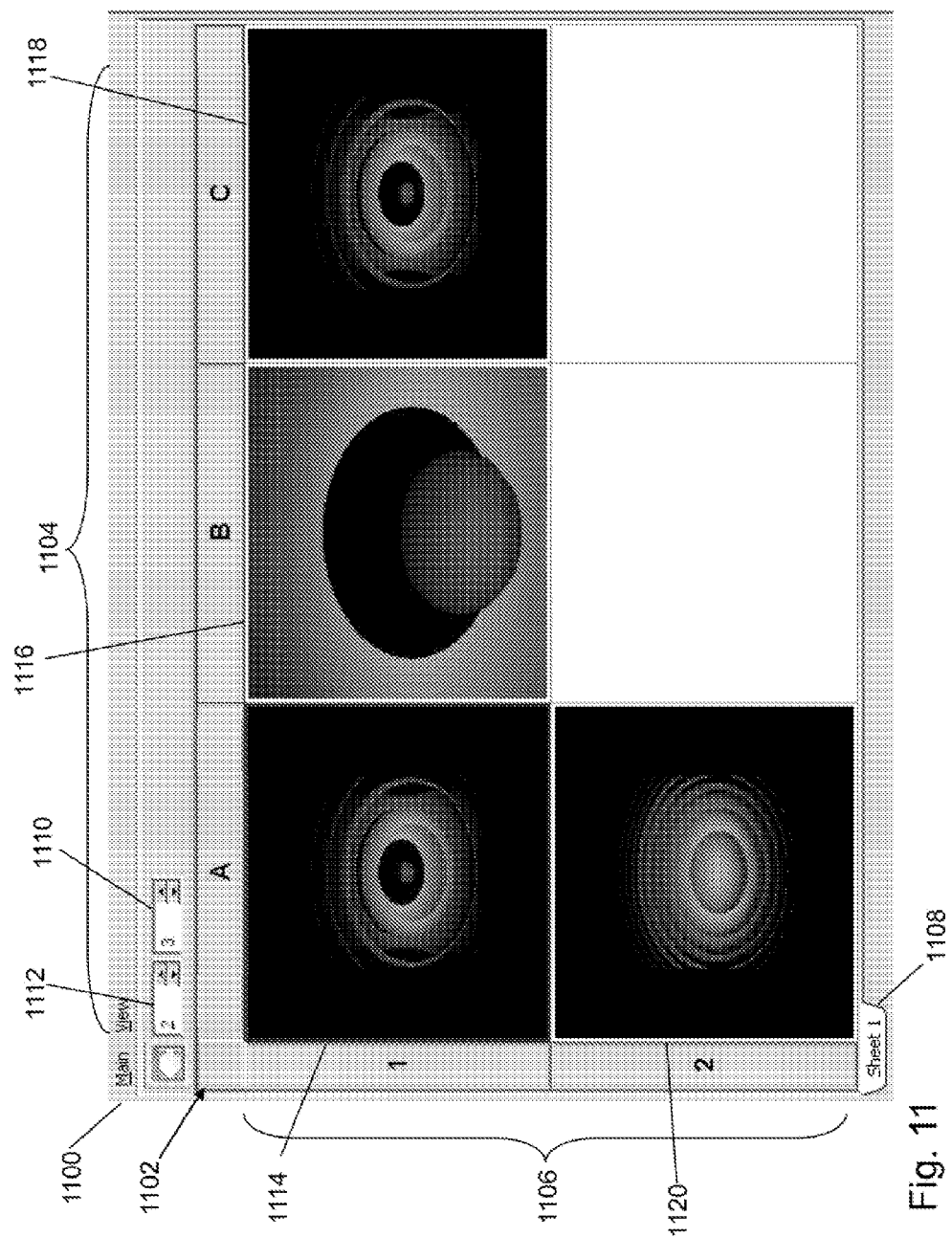
FIG. 11 depicts a user interface of a result presentation application showing first exemplary results in accordance with an exemplary embodiment.

With reference to FIG. 11, a result presentation window 1100 of result presentation application 124 is shown in accordance with an exemplary embodiment. Four dimensions of data products can be presented to the user in a data product grid 1102 of result presentation window 1100. In a column dimension 1104, multiple data products are shown in different columns. The number of columns defaults to three, but may be one or more. The number of columns may be selected by the user using column selector 1110. In a row dimension 1106, multiple data products are shown in different rows. The number of rows defaults to two, but may be one or more. The number of rows may be selected by the user using row selector 1112. In a sheet dimension 1108, multiple data products are shown in different data sheets. The number of sheets defaults to one, but may be one or more. Within each cell of data product grid 1102, a different data product defined based on execution of a different workflow of version tree 300 is shown. In the exemplary embodiment of FIG. 11, column 1, row 1 contains the data product formed form execution of third workflow 308 shown with reference to FIG. 10; column 2, row 1 contains the data product formed form execution of fourth workflow 310 shown with reference to FIG. 10; column 3, row 1 contains the data product formed form execution of sixth workflow 1002 shown with reference to FIG. 10; and column 1, row 2 contains the data product formed form execution of seventh workflow 1004 shown with reference to FIG. 10.

Result presentation application 124 may use various techniques and formats to display and represent the results of a workflow execution. For example, a cell may display a Web page (in hypertext markup language), text, 2-dimensional and 3-dimensional graphs, histograms, animations, numbers, etc. The result presentation interface can be used to display the results of parameter explorations side by side, for example, varying different parameters over different axes, or in an animation performed by repeating a workflow over time. In addition, display cells can share the same cache so that overlapping computations across the corresponding workflows are shared.

Figure 12:
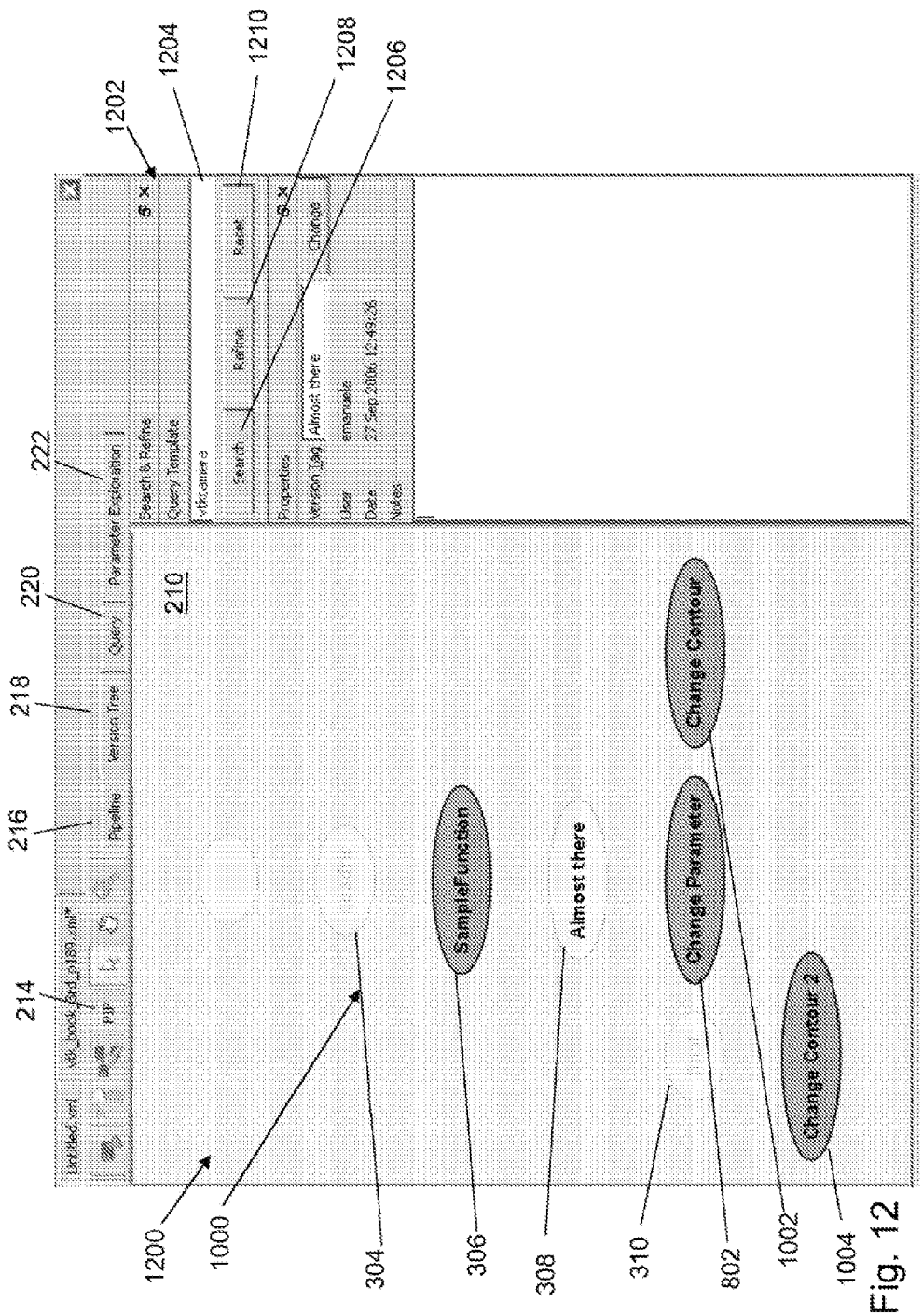
FIG. 12 depicts the user interface of the evolutionary workflow creator application of FIG. 2 displaying a query result window in accordance with an exemplary embodiment.

With reference to FIG. 12, a query result 1200 is shown in accordance with an exemplary embodiment in workflow area 210. The query interface of workflow creator application 122 supports both simple, keyword-based and selection queries such as finding a result created by a given user, as well as complex, structure based queries such as finding results that apply simplification before an isosurface computation for irregular grid data sets. To support simple, keyword-based and selection queries, a query identification area 1202 includes a query text box 1204, a "Search" button 1206, a "Refine" button 1208, and a "Reset" button 1210. Simple keyword-based queries as well as structured queries may be supported. A user identifies a module to be searched for in version tree 1000. The user enters the module name in query text box 1204 and selects "Search" button 1206.

In the exemplary embodiment of FIG. 12, the module having the name "vtkCamera" is to be located in the workflows of version tree 1000. Version tree 1000 is traversed to identify workflows which include the module based on the module name entered. The identified workflows are presented in workflow area 210 through highlighting. For example, in the exemplary embodiment of FIG. 12, second workflow 306, fifth workflow 802, sixth workflow 1002, and seventh workflow 1004 include the selected module. Alternatively, if after specifying a query the user selects "Refine" button 1208, instead of highlighting the selected nodes and graying the nodes that do not match the query, the non-matching nodes are hidden and collapsed into crossed edges.

Figure 13:
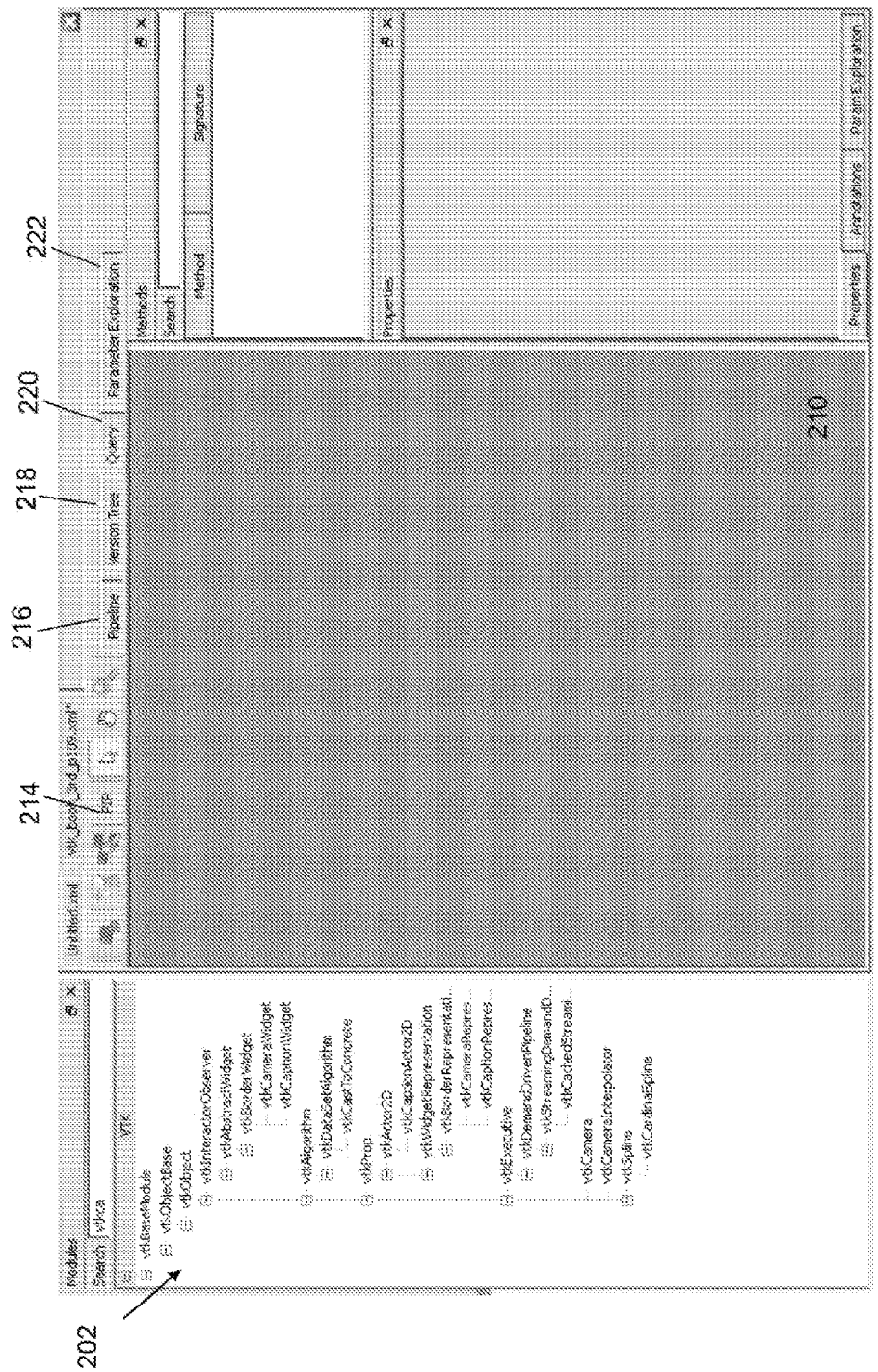
FIG. 13 depicts the user interface of the evolutionary workflow creator application of FIG. 2 displaying a query creation window in accordance with an exemplary embodiment.

With reference to FIG. 13, a query can be defined in workflow area 210 based on user selection of query tab 220 to support complex, structure based queries. Instead of searching for use of a single module in the workflows of the version tree, the user selects query tab 220 to define a plurality of modules and their connectivity for identification in the workflows of the version tree. The user selects the modules from module selection region 202 and defines their connectivity as described with reference to creation or to modification of a workflow thus creating a workflow or sub-workflow to query.

Figure 14:
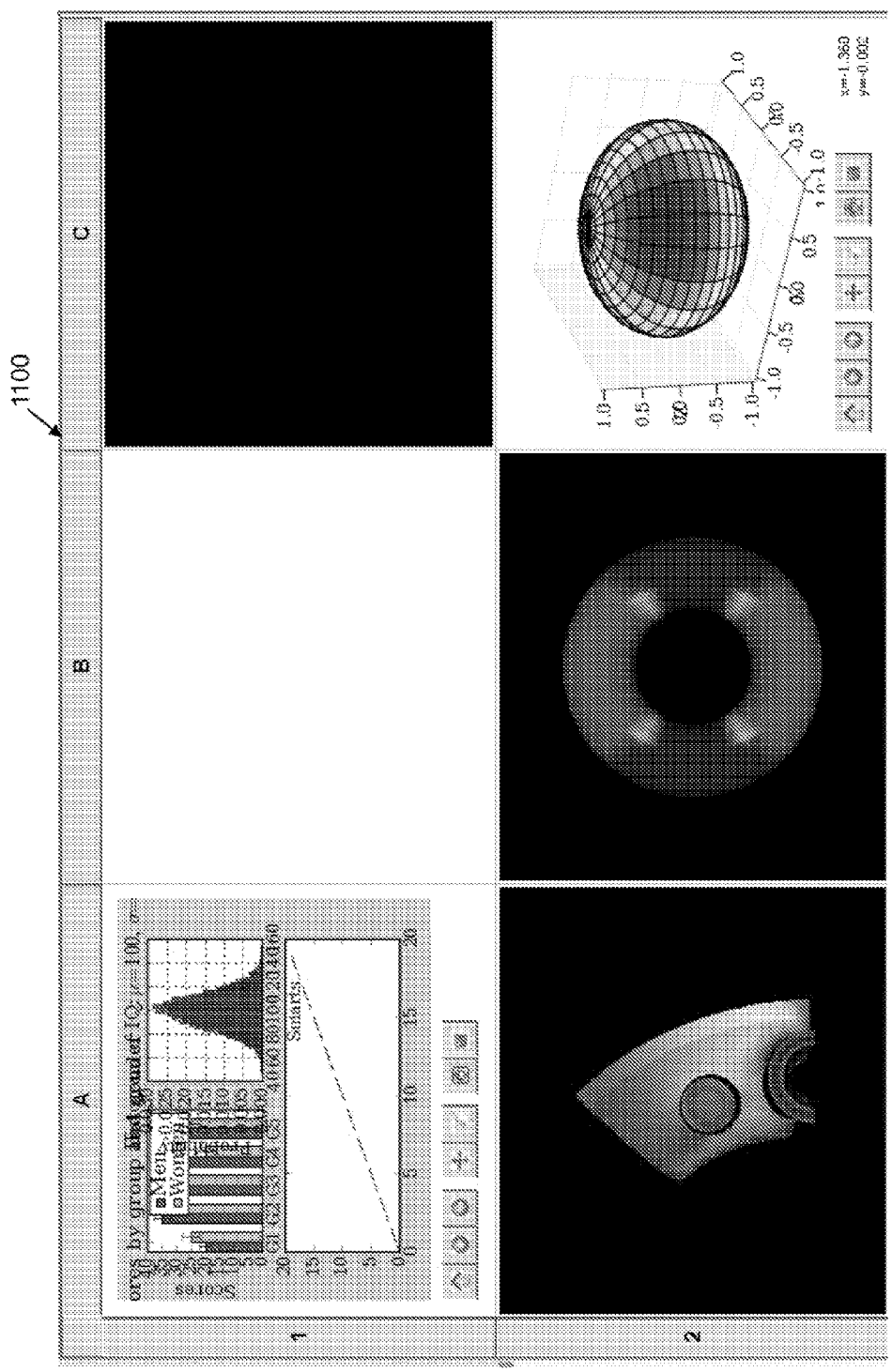
FIG. 14 depicts the user interface of the result presentation application showing second exemplary results in accordance with a second exemplary embodiment.

With reference to FIG. 14, a plurality of data products are shown in result presentation window 1100 of result presentation application 124 in accordance with a second exemplary embodiment. Each cell can contain one or more pictorial representation, one or more numerical representation, one or more textual representation, one or more pictorial animation, and an audible representation. Controls can be included within each cell to control the display, to play an animation within the cell, etc.

Information associated with a version tree is defined based on an extensible markup language (XML) schema in an exemplary embodiment. User interaction with workflow creator application 122 to define workflows is captured as a series of actions of different types. The different actions are associated with adding modules, deleting modules, changing parameter values, adding connections, deleting connections, changing connections, etc. An exemplary XML schema is shown below:

```
<?xml version="1.0" encoding="UTF-8"?>
<xs: schema xmlns:xs="http://www.w3.org/2001/XMLSchema" elementFormDefault="qualified"
attributeFormDefault="unqualified">
    <xs:element name="visTrail">
        <xs:annotation>
            <xs:documentation>Comment describing your root element</xs:documentation>
        </xs:annotation>
        <xs:complexType>
            <xs:sequence maxOccurs="unbounded">
                <xs:sequence maxOccurs="unbounded">
                    <xs:element name="action">
                        <xs:complexType>
```

```
-continued

<xs:sequence>
  <xs:element name="notes" minOccurs="0"/>
  <xs:choice>
    <xs:sequence maxOccurs="unbounded">
      <xs:element name="move">
        <xs:complexType>
          <xs:attribute name="dx" type="xs:float"/>
          <xs:attribute name="dy" type="xs:float"/>
          <xs:attribute name="id" type="xs:int"/>
        </xs:complexType>
      </xs:element>
    </xs:sequence>
    <xs:element name="object">
      <xs:complexType>
        <xs:attribute name="cache" type="xs:int"/>
        <xs:attribute name="id" type="xs:int"/>
        <xs:attribute name="name" type="xs:string"/>
        <xs:attribute name="x" type="xs:float"/>
        <xs:attribute name="y" type="xs:float"/>
      </xs:complexType>
    </xs:element>
    <xs:sequence maxOccurs="unbounded">
      <xs:element name="set">
        <xs:complexType>
          <xs:attribute name="function" type="xs:string"/>
          <xs:attribute name="functionId" type="xs:int"/>
          <xs:attribute name="moduleId" type="xs:int"/>
          <xs:attribute name="parameter" type="xs:string"/>
          <xs:attribute name="parameterId" type="xs:int"/>
          <xs:attribute name="type" type="xs:string"/>
          <xs:attribute name="value" type="xs:anySimpleType"/>
        </xs:complexType>
      </xs:element>
    </xs:sequence>
    <xs:element name="connect">
      <xs:complexType>
        <xs:choice>
          <xs:element name="filterInput">
            <xs:complexType>
              <xs:attribute name="destId" type="xs:int"/>
              <xs:attribute name="destPort" type="xs:int"/>
              <xs:attribute name="sourceId" type="xs:int"/>
              <xs:attribute name="sourcePort" type="xs:int"/>
            </xs:complexType>
          </xs:element>
          <xs:element name="objectInput">
            <xs:complexType>
              <xs:attribute name="destId" type="xs:int"/>
              <xs:attribute name="name" type="xs:string"/>
              <xs:attribute name="sourceId" type="xs:int"/>
            </xs:complexType>
          </xs:element>
        </xs:choice>
        <xs:attribute name="id" type="xs:int"/>
      </xs:complexType>
    </xs:element>
    <xs:sequence maxOccurs="unbounded">
      <xs:element name="connection">
        <xs:complexType>
          <xs:attribute name="connectionId" type="xs:int"/>
        </xs:complexType>
      </xs:element>
    </xs:sequence>
    <xs:sequence maxOccurs="unbounded">
      <xs:element name="module">
        <xs:complexType>
          <xs:attribute name="moduleId" type="xs:int"/>
        </xs:complexType>
      </xs:element>
    </xs:sequence>
    <xs:element name="function">
      <xs:complexType>
        <xs:attribute name="functionId" type="xs:int"/>
        <xs:attribute name="moduleId" type="xs:int"/>
      </xs:complexType>
    </xs:element>
  </xs:choice>
</xs:sequence>
<xs:attribute name="parent" type="xs:int"/>
```

```
            <xs:attribute name="time" type="xs:int"/>
            <xs:attribute name="what" type="xs:string"/>
            <xs:attribute name="date" type="xs:string" use="optional"/>
            <xs:attribute name="user" type="xs:string" use="optional"/>
            <xs:attribute name="notes" type="xs:string" use="optional"/>
          </xs:complexType>
        </xs:element>
      </xs:sequence>
      <xs:sequence minOccurs="0" maxOccurs="unbounded">
        <xs:element name="tag">
          <xs:complexType>
            <xs:attribute name="name" type="xs:string"/>
            <xs:attribute name="time" type="xs:int"/>
          </xs:complexType>
        </xs:element>
      </xs:sequence>
      <xs:sequence minOccurs="0" maxOccurs="unbounded">
        <xs:element name="macro">
          <xs:complexType>
            <xs:sequence minOccurs="0" maxOccurs="unbounded">
              <xs:element name="action">
                <xs:complexType>
                  <xs:attribute name="time" type="xs:int"/>
                </xs:complexType>
              </xs:element>
            </xs:sequence>
            <xs:attribute name="name" type="xs:string"/>
            <xs:attribute name="id" type="xs:int"/>
            <xs:attribute name="desc" type="xs:string" use="optional"/>
          </xs:complexType>
        </xs:element>
      </xs:sequence>
    </xs:sequence>
  </xs:complexType>
</xs:element>
</xs:schema>
```

A portion of an exemplary XML file defined based on the XML schema is shown below for version tree 1000. Other representations are possible. To capture the provenance information, a "date" tag and a "user" tag are included for each "action". Linkage between modules is defined using the "parent" tag for each "action". The action is assigned an identifier based on the "time" tag for each "action" which is the value referenced in the "parent" tag for a child action. The action type is assigned based on the "what" tag for each "action". Depending on the value associated with the "what" tag, additional parameters are defined based on the XML schema. For example, some actions include "object" parameters that may include a "name" tag which may be the module name.

```
<visTrail version="0.3.1">
<action date="27 Sep 2006 12:35:44" parent="0" time="2" user="emanuele" what="addModule">
   <object cache="1" id="0" name="vtkQuadric" x="-0.373626375095" y="2.38827838828" />
</action>
<action date="27 Sep 2006 12:36:09" parent="2" time="3" user="emanuele" what="moveModule">
   <move dx="-7.32600751855" dy="112.087914593" id="0" />
</action>
<action date="27 Sep 2006 12:36:09" parent="3" time="4" user="emanuele" what="changeParameter">
   <set alias="" function="SetCoefficients" functionId="0" moduleId="0" parameter="<no description>" parameterId="0"
type="Float" value="0.0" />
   <set alias="" function="SetCoefficients" functionId="0" moduleId="0" parameter="<no description>" parameterId="1"
type="Float" value="0.0" />
   <set alias="" function="SetCoefficients" functionId="0" moduleId="0" parameter="<no description>" parameterId="2"
type="Float" value="0.0" />
   <set alias="" function="SetCoefficients" functionId="0" moduleId="0" parameter="<no description>" parameterId="3"
type="Float" value="0.0" />
   <set alias="" function="SetCoefficients" functionId="0" moduleId="0" parameter="<no description>" parameterId="4"
type="Float" value="0.0" />
   <set alias="" function="SetCoefficients" functionId="0" moduleId="0" parameter="<no description>" parameterId="5"
type="Float" value="0.0" />
   <set alias="" function="SetCoefficients" functionId="0" moduleId="0" parameter="<no description>" parameterId="6"
type="Float" value="0.0" />
   <set alias="" function="SetCoefficients" functionId="0" moduleId="0" parameter="<no description>" parameterId="7"
type="Float" value="0.0" />
```

-continued

```
    <set alias="" function="SetCoefficients" functionId="0" moduleId="0" parameter="<no description>" parameterId="8" type="Float" value="0.0" />
    <set alias="" function="SetCoefficients" functionId="0" moduleId="0" parameter="<no description>" parameterId="9" type="Float" value="0.0" />
</action>
...
<action date="27 Sep 2006 12:40:58" parent="33" time="34" user="emanuele" what="addConnection">
    <connect destinationId="2" destinationModule="vtkContourFilter" destinationPort="SetInputConnection0(vtkAlgorithmOutput)" id="1" sourceId="1" sourceModule="vtkSampleFunction" sourcePort="GetOutputPort0(vtkAlgorithmOutput)" />
</action>
...
<action date="27 Sep 2006 12:52:43" parent="77" time="78" user="emanuele" what="addModule">
    <object cache="1" id="9" name="vtkCamera" x="-384.141365773" y="-610.692477838" />
</action>
<action date="27 Sep 2006 12:52:47" parent="78" time="79" user="emanuele" what="moveModule">
    <move dx="16.3608248779" dy="73.6237132673" id="9" />
</action>
<action date="27 Sep 2006 12:52:47" parent="79" time="80" user="emanuele" what="addConnection">
    <connect destinationId="8" destinationModule="vtkRenderer" destinationPort="SetActiveCamera(vtkCamera)" id="11" sourceId="9" sourceModule="vtkCamera" sourcePort="self(vtkCamera)" />
</action>
<action date="27 Sep 2006 12:53:12" parent="80" time="81" user="emanuele" what="moveModule">
    <move dx="14.3157217682" dy="49.0824755115" id="9" />
</action>
<action date="27 Mar 2007 13:10:55" parent="77" time="82" user="cbell" what="changeParameter">
    <set alias="" function="SetSampleDimensions" functionId="0" moduleId="1" parameter="<no description>" parameterId="0" type="Integer" value="40" />
    <set alias="" function="SetSampleDimensions" functionId="0" moduleId="1" parameter="<no description>" parameterId="1" type="Integer" value="50" />
    <set alias="" function="SetSampleDimensions" functionId="0" moduleId="1" parameter="<no description>" parameterId="2" type="Integer" value="50" />
</action>
<action date="27 Mar 2007 13:10:57" parent="82" time="83" user="cbell" what="changeParameter">
    <set alias="" function="SetSampleDimensions" functionId="0" moduleId="1" parameter="<no description>" parameterId="0" type="Integer" value="40" />
    <set alias="" function="SetSampleDimensions" functionId="0" moduleId="1" parameter="<no description>" parameterId="1" type="Integer" value="40" />
    <set alias="" function="SetSampleDimensions" functionId="0" moduleId="1" parameter="<no description>" parameterId="2" type="Integer" value="50" />
</action>
<action date="27 Mar 2007 13:11:03" parent="83" time="84" user="cbell" what="changeParameter">
    <set alias="" function="SetSampleDimensions" functionId="0" moduleId="1" parameter="<no description>" parameterId="0" type="Integer" value="40" />
    <set alias="" function="SetSampleDimensions" functionId="0" moduleId="1" parameter="<no description>" parameterId="1" type="Integer" value="40" />
    <set alias="" function="SetSampleDimensions" functionId="0" moduleId="1" parameter="<no description>" parameterId="2" type="Integer" value="40" />
</action>
<action date="27 Mar 2007 13:14:12" parent="77" time="85" user="cbell" what="changeParameter">
    <set alias="" function="GenerateValues" functionId="0" moduleId="2" parameter="<no description>" parameterId="0" type="Integer" value="10" />
    <set alias="" function="GenerateValues" functionId="0" moduleId="2" parameter="<no description>" parameterId="1" type="Float" value="0" />
    <set alias="" function="GenerateValues" functionId="0" moduleId="2" parameter="<no description>" parameterId="2" type="Float" value="1.2" />
</action>
<action date="27 Mar 2007 13:15:36" parent="81" time="86" user="cbell" what="changeParameter">
    <set alias="" function="GenerateValues" functionId="0" moduleId="2" parameter="<no description>" parameterId="0" type="Integer" value="10" />
    <set alias="" function="GenerateValues" functionId="0" moduleId="2" parameter="<no description>" parameterId="1" type="Float" value="0" />
    <set alias="" function="GenerateValues" functionId="0" moduleId="2" parameter="<no description>" parameterId="2" type="Float" value="1.2" />
</action>
<tag name="SampleFunction" time="27" />
<tag name="Change Contour" time="85" />
<tag name="Change Parameter" time="84" />
<tag name="Change Contour 2" time="86" />
<tag name="quadric" time="3" />
<tag name="Almost there" time="77" />
<tag name="final" time="81" />
</visTrail>
```

Workflows are uniquely identified by the "time" element. Optionally, a tag field can be defined to name a particular workflow using "tag" fields as shown above. Associated with each "tag" field is a name of the workflow, which is presented in the oval of the version tree, and an action identifier, which identifies the action that starts the workflow modifications to its parent. For example, as shown above, fourth workflow 310 has the name "final" as shown in version tree 1000 with reference to FIG. 10, and starts at the action having time tag value 81 or the action shown below:

```
<action date="27 Sep 2006 12:53:12" parent="80" time="81" user="emanuele" what="moveModule">
    <move dx="14.3157217682" dy="49.0824755115" id="9" />
</action>
```

Different storage architectures can be used for the provenance information. They include files in a file system, native XML databases, relational databases, etc.

Figure 15:
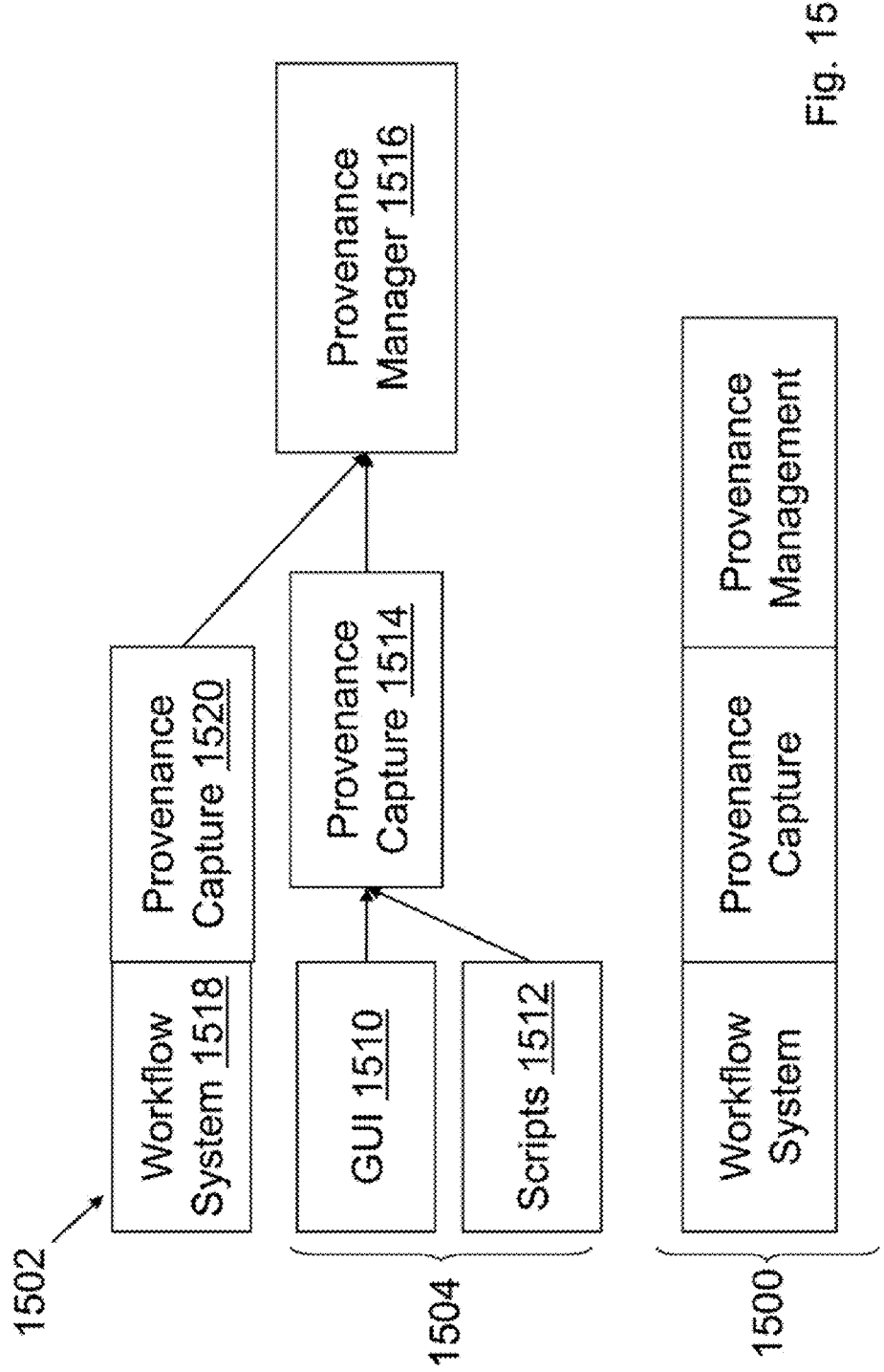
FIG. 15 depicts block diagrams of a plurality of workflow processing systems.

The embodiments described use a tightly-coupled architecture 1500, shown with reference to FIG. 15, where the provenance management is performed in the same environment in which the workflows are created and change actions are captured. Other loosely coupled embodiments are possible in which the provenance management and capture occur in different environments. For example, a first loosely coupled system 1502 includes a workflow system 1518, a provenance capture module 1520, and a provenance manager 1516. Workflow system 1518 and provenance capture module 1520 are tightly coupled in the same environment. Change notifications may be sent to provenance manager 1516 for example, in a client-server fashion. As another example, a second loosely coupled system 1504 includes a graphical user interface (GUI) 1510, scripts 1512, a provenance capture module 1514, and provenance manager 1516. User interactions with GUI 1510 and scripts 1512 are captured and sent to provenance capture module 1514, for example, in a client-server fashion. Provenance capture change notifications may be sent to provenance manager 1516, for example, in a client-server fashion.

Figure 16:
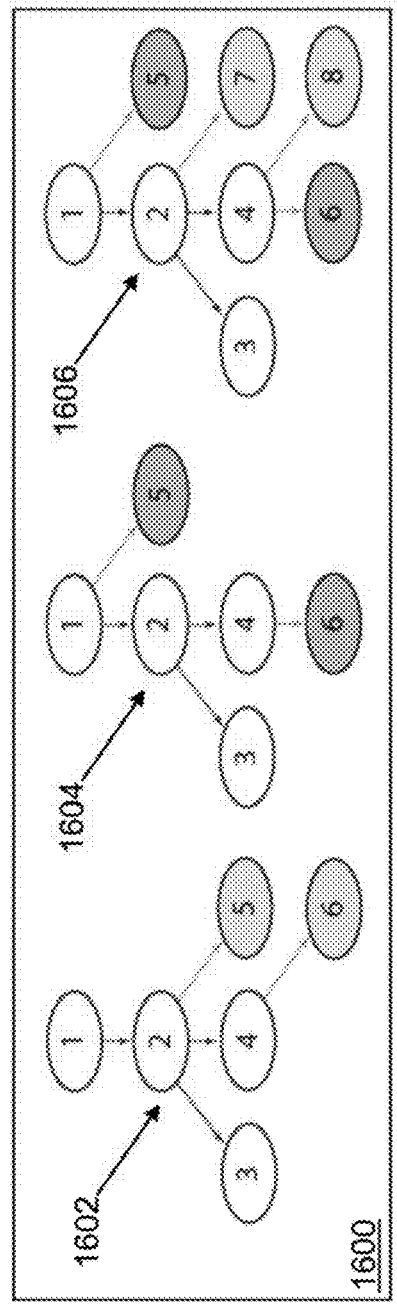
FIG. 16 depicts a high-level overview of a synchronization process in accordance with an exemplary embodiment.

With reference to FIG. 16, a high-level overview of a synchronization process 1600 is provided in accordance with an exemplary embodiment. A first user creates an evolutionary workflow process, which includes timestamps 1-4. A second user checks out the evolutionary workflow process and develops a first evolutionary workflow process 1602, which adds timestamps 5 and 6. Timestamps 5 and 6 are associated with modifications to the evolutionary workflow process performed by the second user. A third user checks out the evolutionary workflow process and develops a second evolutionary workflow process 1604, which adds timestamps 5 and 6. Timestamps 5 and 6 are associated with modifications to the evolutionary workflow process performed by the third user. As a result, when the third user and/or the second user check in their evolutionary workflow processes to the evolutionary workflow process acting as a parent repository, some timestamps are changed as shown with reference to third evolutionary workflow process 1606, which is saved as the evolutionary workflow process and which includes modifications performed by the third user and the second user.

To perform synchronization, synchronization points are identified. The synchronization points are the overlapping nodes and edges in the two version trees being compared. When an evolutionary workflow process is 'checked-out', the system keeps track of the largest timestamp at checkout, i.e., "4" as in the example above. When an updated evolutionary workflow process is "checked-in", because the evolutionary workflow process is monotonic (nothing is deleted), synchronization is applied only to the nodes with a timestamp>4. For clarity, an evolutionary workflow process is captured and presented as a version tree. To merge two evolutionary workflow processes, it is sufficient to add all workflow nodes created in the independent versions of the evolutionary workflow processes while maintaining a locally unique set of timestamps for each action associated with the added workflow nodes. As shown with reference to third evolutionary workflow process 1606, the timestamps 5 and 6 of the second user are re-labeled as 7 and 8.

To perform synchronization in a P2P environment, the process is more complex to ensure that the re-numberings are performed correctly. Because timestamps only need to be unique and persistent locally, a re-labeling map is created and maintained for each synchronization server from which a user in the P2P network executes a check-out/check-in process and is associated with the local evolutionary workflow process. Thus, re-labeling maps may be used when there are multiple synchronization servers. At each check-out, information about the original synchronization server is kept. An evolutionary workflow process checked-out from a first server $S_1$ can only be checked back into $S_1$. If the evolutionary workflow process is saved to a server $S_2$, so that it can be exported to other users, a re-labeling map should be created in $S_2$.

The information about the original synchronization server as well as the re-labeling map is associated with the evolutionary workflow process. The re-labeling map can be saved together with the evolutionary workflow process (e.g., XML specification in a database, XML specification in a separate file, tables in a relational database, etc.) as long as the association is maintained. The re-labeling map is associated with a synchronization server that exports a given evolutionary workflow process. A synchronization server can serve (receive and export) changes performed by multiple users.

In an exemplary embodiment, a set of bijective functions $f_i: N \rightarrow N$ is used to form the re-labeling map. The function $f_i$ maps timestamps in the original evolutionary workflow process that is checked-out to new timestamps in the modified evolutionary workflow process. The re-labeling map includes a set of external labels associated with a set of local labels. The set of external labels for a child are the timestamps assigned by a parent evolutionary workflow process i when the child evolutionary workflow process is checked in to the parent evolutionary workflow process i in order to maintain a unique set of timestamps in the parent evolutionary workflow process i. The set of external labels for a child are the timestamps assigned by the child evolutionary workflow process as the user interacts with their evolutionary workflow tool 112. The set of local labels are the timestamps assigned during local execution of the evolutionary workflow process or check-in of a child evolutionary workflow process.

The set of internal labels are exposed when an evolutionary workflow process is used as a repository because the internal labels are consistent with the evolutionary workflow process. When the user stores a set of actions, the parent evolutionary workflow process provides a new set of timestamps by creating new entries in the parent's evolutionary workflow process and updating the re-labeling map to indicate a mapping between the set of external labels and the set of local labels. The re-labeling map of the child evolutionary workflow process modifies the set of external labels based on the new set of timestamps assigned by and received from the parent. As a result, the second user's re-labeling map set of external labels is changed from {5,6} to {7,8}, though the set of local labels remains {5,6}. If $f_B$ is denoted as the old re-labeling map, and $f'_B$ is denoted as the new re-labeling map, $f_B(5)=f'_B(7)$, $f_B(6)=f'_B(8)$, and so on. Thus, even though a user's local timestamps may change when stored to the parent evolutionary workflow process, each evolutionary workflow process exposes locally consistent, unchanging timestamps to other users, ensuring correct distributed behavior.

Figure 17:
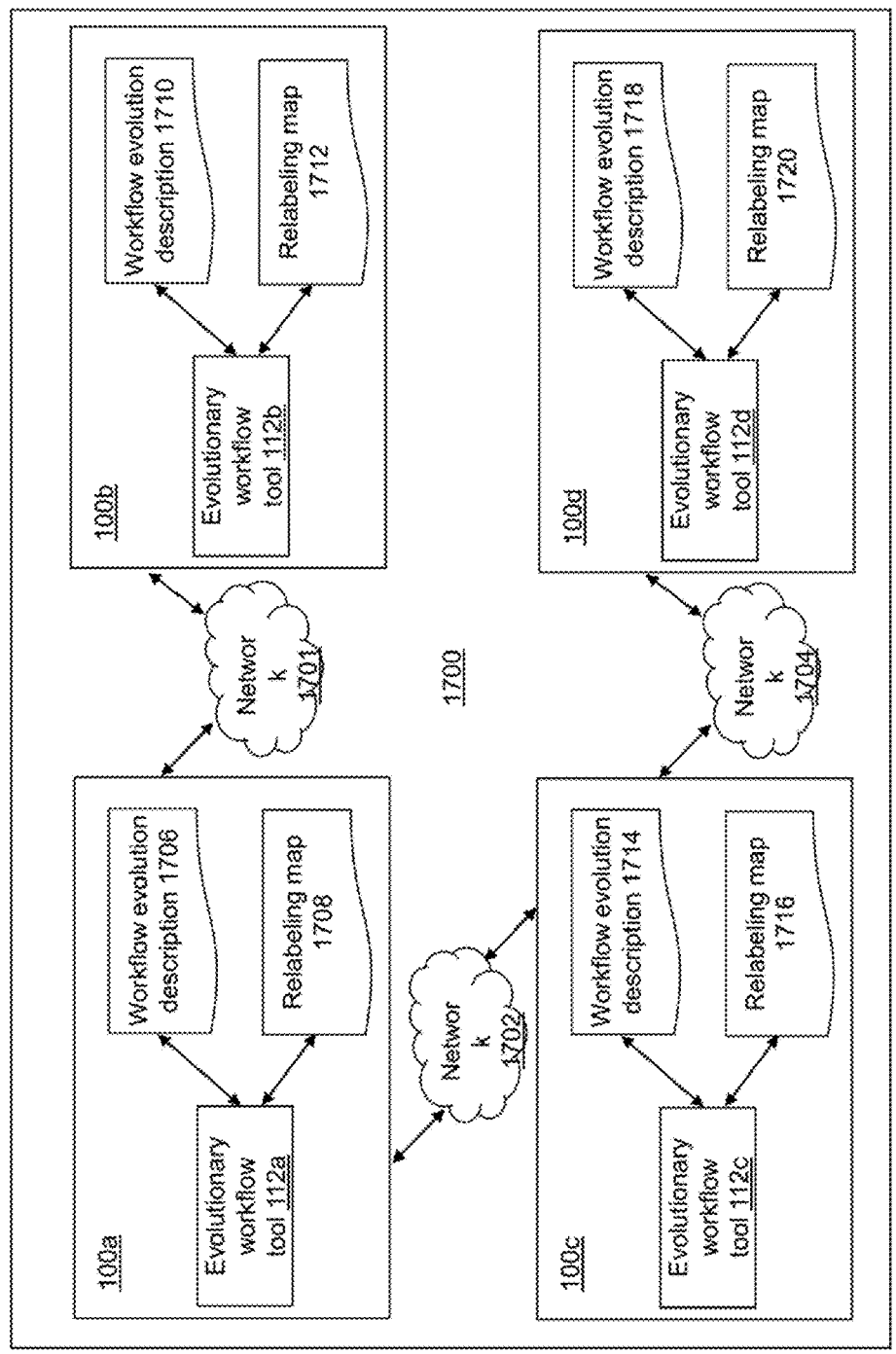
FIG. 17 depicts a collaborative data analysis system in accordance with an exemplary embodiment.

With reference to FIG. 17, a collaborative workflow evolution system 1700 is shown in accordance with an exemplary embodiment. Collaborative workflow evolution system 1700 includes a first device 100a, a second device 100b, a third device 100c, and a fourth device 100d. First device 100a, second device 100b, third device 100c, and fourth device 100d may each be instances of evolutionary workflow processing system 100 described with reference to FIG. 1. A first user executes a first evolutionary workflow tool 112a at first device 100a. A second user executes a second evolutionary workflow tool 112b at second device 100b. A third user executes a third evolutionary workflow tool 112c at third device 100c. A fourth user executes a fourth evolutionary workflow tool 112d at fourth device 100d. First evolutionary workflow tool 112a, second evolutionary workflow tool 112b, third evolutionary workflow tool 112c, and fourth evolutionary workflow tool 112d may each be instances of evolutionary workflow tool 112 described with reference to FIG. 1.

First device 100a communicates with second device 100b through a first network 1701. First device 100a communicates with third device 100c through a second network 1702. Third device 100c communicates with fourth device 100d through a third network 1704. First network 1701, second network 1702, and/or third network 1704 may be any type of network such as a local area network (LAN), a wide area network (WAN), a cellular network, the Internet, etc. Additionally, first network 1701, second network 1702, and/or third network 1704 may include a peer-to-peer network (P2P) and/or a client-server network. In a client-server network, a single centralized synchronization server may be used with all modifications sent to and retrieved from the centralized synchronization server. In a P2P, multiple servers may be allowed to receive and to export data associated with evolutionary workflow processes. First device 100a, second device 100b, third device 100c, and fourth device 100d communicate using communication interface 108 implemented at each device and discussed with reference to FIG. 1. Collaborative workflow evolution system 1700 may include additional or fewer networks.

First device 100a includes a first workflow evolution description 1706 and a first re-labeling map 1708. In an exemplary embodiment, first workflow evolution description 1706 is an evolutionary workflow process repository for a first evolutionary workflow process stored, for example, using the action based XML schema described previously. First re-labeling map 1708 includes a first set of external labels associated with a first set of local labels.

Second device 100b includes a second workflow evolution description 1710 and a second re-labeling map 1712. In an exemplary embodiment, second workflow evolution description 1710 is an evolutionary workflow process repository for a second evolutionary workflow process stored using the action based XML schema described previously. Second re-labeling map 1708 includes a second set of external labels associated with a second set of local labels. In the exemplary embodiment of FIG. 17, second workflow evolution description 1710 is created by checking out first workflow evolution description 1706. After check-out, second workflow evolution description 1710 may be modified. First workflow evolution description 1706 may also be modified independently.

Third device 100c includes a third workflow evolution description 1714 and a third re-labeling map 1716. In an exemplary embodiment, third workflow evolution description 1714 is an evolutionary workflow process repository for a third evolutionary workflow process stored using the action based XML schema described previously. Third re-labeling map 1716 includes a third set of external labels associated with a third set of local labels. In the exemplary embodiment of FIG. 17, third workflow evolution description 1710 is created by checking out and modifying first workflow evolution description 1706.

Fourth device 100d includes a fourth workflow evolution description 1718 and a fourth re-labeling map 1720. In an exemplary embodiment, fourth workflow evolution description 1718 is an evolutionary workflow process repository for a fourth evolutionary workflow process stored using the action based XML schema described previously. Fourth re-labeling map 1720 includes a fourth set of external labels associated with a fourth set of local labels. In the exemplary embodiment of FIG. 17, fourth workflow evolution description 1714 is created by checking out and modifying third workflow evolution description 1714. The workflow evolution descriptions 1706, 1710, 1714, 1718 and the re-labeling maps 1708, 1712, 1716, 1720 may be stored in database 126 implemented at each device 100a, 100b, 100c, 100d and discussed with reference to FIG. 1.

The second user checks out first workflow evolution description 1706, which includes local labels (timestamps) 1-4 and external labels 10-40 and develops second workflow evolution description 1710. The third user checks out first workflow evolution description 1706 and develops third workflow evolution description 1714. The fourth user checks out third workflow evolution description 1714 and develops fourth workflow evolution description 1718. Assume first re-labeling map 1708 contains the following mapping:

| local | 1 | 2 | 3 | 4 |
|---|---|---|---|---|
| external | 10 | 20 | 30 | 40 |

Assume second re-labeling map 1712 contains the following mapping:

| local | 10 | 20 | 30 | 40 |
|---|---|---|---|---|
| external | 100 | 200 | 300 | 400 |

Assume third re-labeling map 1716 contains the following mapping:

| local | 10 | 20 | 30 | 40 |
|---|---|---|---|---|
| external | 100 | 200 | 300 | 400 |

Assume fourth re-labeling map 1720 contains the following mapping:

| local | 100 | 200 | 300 | 400 |
|---|---|---|---|---|
| external | 1000 | 2000 | 3000 | 4000 |

The second user performs two actions after checking out first workflow evolution description 1706. The actions associated with timestamps 50 and 60 are added to second workflow evolution description 1710 as the second user interacts with second evolutionary workflow tool 112b. Second re-labeling map 1712 is modified to include the following mapping:

| local    | 10  | 20  | 30  | 40  | 50  | 60  |
|----------|-----|-----|-----|-----|-----|-----|
| external | 100 | 200 | 300 | 400 | 500 | 600 |

The third user performs two actions after checking out first workflow evolution description 1706. The actions associated with timestamps 50 and 60 are added to third workflow evolution description 1714 as the third user interacts with third evolutionary workflow tool 112c. Third re-labeling map 1716 is modified to include the following mapping:

| local    | 10  | 20  | 30  | 40  | 50  | 60  |
|----------|-----|-----|-----|-----|-----|-----|
| external | 100 | 200 | 300 | 400 | 500 | 600 |

The second user checks-in first workflow evolution description 1706. External labels 500 and 600 and are determined to be unique to the first evolutionary workflow process at check-in. As a result, the actions associated with timestamps 500 and 600 are added to first workflow evolution description 1706. First re-labeling map 1708 is modified to include the following mapping and second re-labeling map 1712 is unchanged:

| local    | 1  | 2  | 3  | 4  | 5  | 6  |
|----------|----|----|----|----|----|----|
| external | 10 | 20 | 30 | 40 | 50 | 60 |

After the second user checks-in first workflow evolution description 1706, the third user checks-in first workflow evolution description 1706. The external labels 500 and 600 are determined not to be unique to the first evolutionary workflow process. As a result, the actions associated with external labels 500 and 600 are added to first workflow evolution description 1706 with updated timestamps. Second re-labeling map 1708 is modified to include the following mapping which renumbers external labels 50 and 60 of third re-labeling map 1716 to external labels 70 and 80, respectively:

| local    | 1  | 2  | 3  | 4  | 5  | 6  | 7  | 8  |
|----------|----|----|----|----|----|----|----|----|
| external | 10 | 20 | 30 | 40 | 50 | 60 | 70 | 80 |

Thus, the modifications made by the third user are renumbered as 70 and 80. The changes to first re-labeling map 1708 are applied to third re-labeling map 1716 to include the following mapping where external labels 500 and 600 correspond to the modifications performed by the second user and external labels 700 and 800 correspond to the modifications performed by the third user:

| local    | 10  | 20  | 30  | 40  | 50  | 60  | 70  | 80  |
|----------|-----|-----|-----|-----|-----|-----|-----|-----|
| external | 100 | 200 | 300 | 400 | 500 | 600 | 700 | 800 |

The fourth user performs two actions after checking out third workflow evolution description 1714. Fourth re-labeling map 1720 is modified to include the following mapping:

| local    | 100  | 200  | 300  | 400  | 500  | 600  | 700  | 800  |
|----------|------|------|------|------|------|------|------|------|
| external | 1000 | 2000 | 3000 | 4000 | 5000 | 6000 | 7000 | 8000 |

The fourth user checks-in third workflow evolution description 1714. Third re-labeling map 1716 is modified to include the following mapping which renumbers external labels 7000 and 8000 of fourth re-labeling map 1720 to external labels 900 and 100, respectively:

| local    | 10  | 20  | 30  | 40  | 50  | 60  | 70  | 80  | 90  | 100  |
|----------|-----|-----|-----|-----|-----|-----|-----|-----|-----|------|
| external | 100 | 200 | 300 | 400 | 500 | 600 | 700 | 800 | 900 | 1000 |

The changes to third re-labeling map 1716 are applied to fourth re-labeling map 1720 to include the following mapping where local labels 900 and 1000 correspond to the modifications performed by the fourth user:

| local    | 100  | 200  | 300  | 400  | 500  | 600  | 700  | 800  | 900  | 1000  |
|----------|------|------|------|------|------|------|------|------|------|-------|
| external | 1000 | 2000 | 3000 | 4000 | 5000 | 6000 | 7000 | 8000 | 9000 | 10000 |

Figure 18:
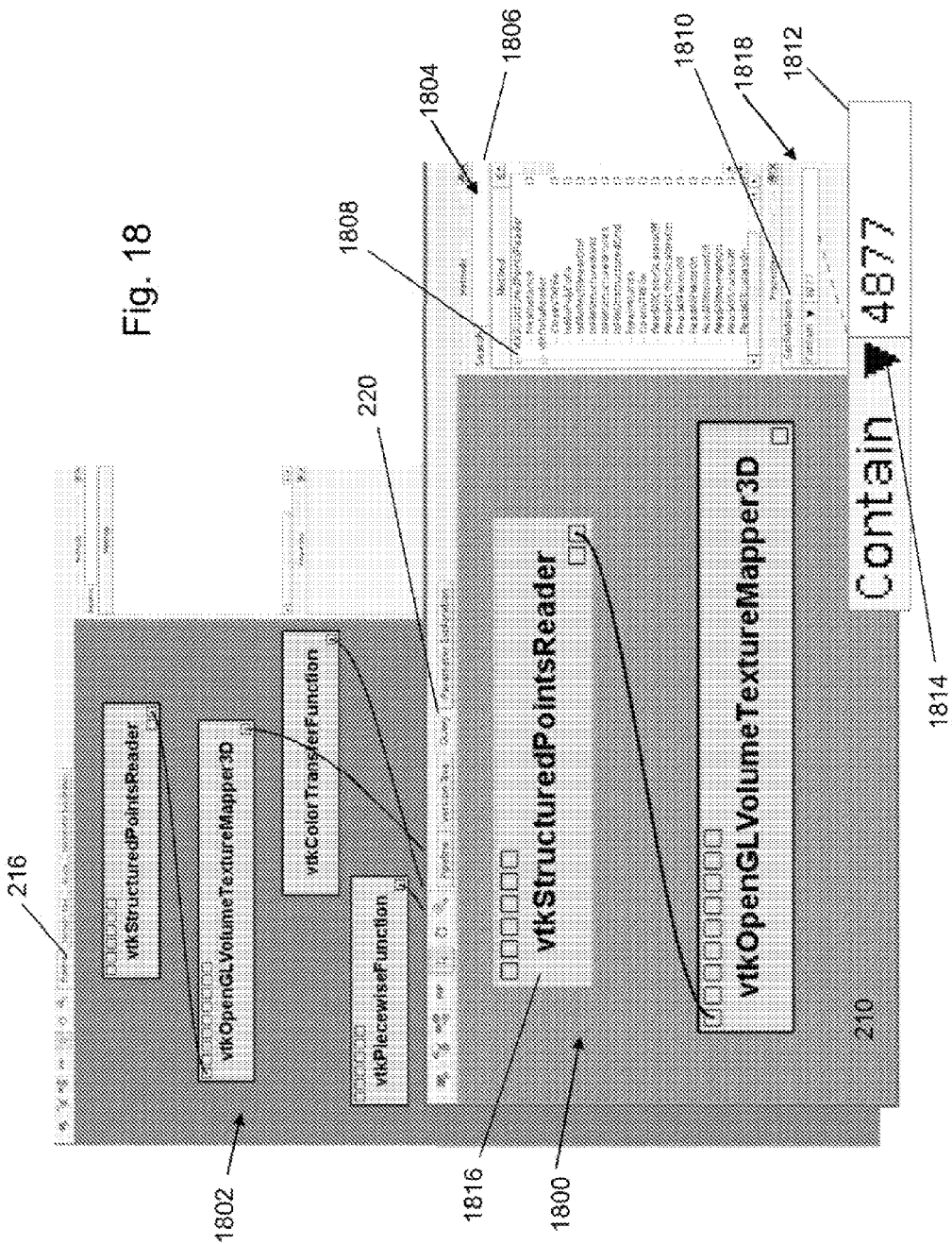
FIG. 18 depicts the user interface of the evolutionary workflow creator application of FIG. 2 displaying the query creation window including a sample query definition in accordance with an exemplary embodiment.

With reference to FIG. 18, a query sub-workflow 1800 is defined in workflow area 210 of query tab 220. In an exemplary embodiment, a user selects a portion of an initial workflow 1802 defined in workflow area 210 of workflow tab 216, copies the selected portion to a memory such as a clipboard, selects query tab 220, and pastes the copied portion to workflow area 210 of query tab 220. For example, the user may select query sub-workflow 1800 by dragging a mouse over a portion of initial workflow 1802 as known to those skilled in the art. The user may select and define additional query criteria using a property query area 1804.

Property query area 1804 may include a search method text box 1806, a method tree 1808, a property list 1810, a property criteria text box 1812, and a comparator type selector 1814 (shown exploded for legibility). The user may enter a portion of a method name in search method text box 1806 to locate the method in method tree 1808. Method tree 1808 includes a tree of methods associated with a selected workflow 1816, titled "vtkStructuredPointsReader", of query sub-workflow 1800. The user selects a method presented in method tree 1808. Properties of the selected method are presented in property list 1810. The user selects a property presented in property list 1810 and one or more text boxes associated with the selected property are presented in property area 1818. The user enters an appropriate value in property criteria text box 1812 and selects a comparison type using comparator type selector 1814. Exemplary comparison types include "contain", "does not contain", <, >, ≥, ≤, =, ≠, etc. Property area 1818 may include a plurality of properties in property list 1810. Additionally, property area 1818 may include a plurality of property criteria text boxes each associated with a comparator type selector 1814.

Figure 19:
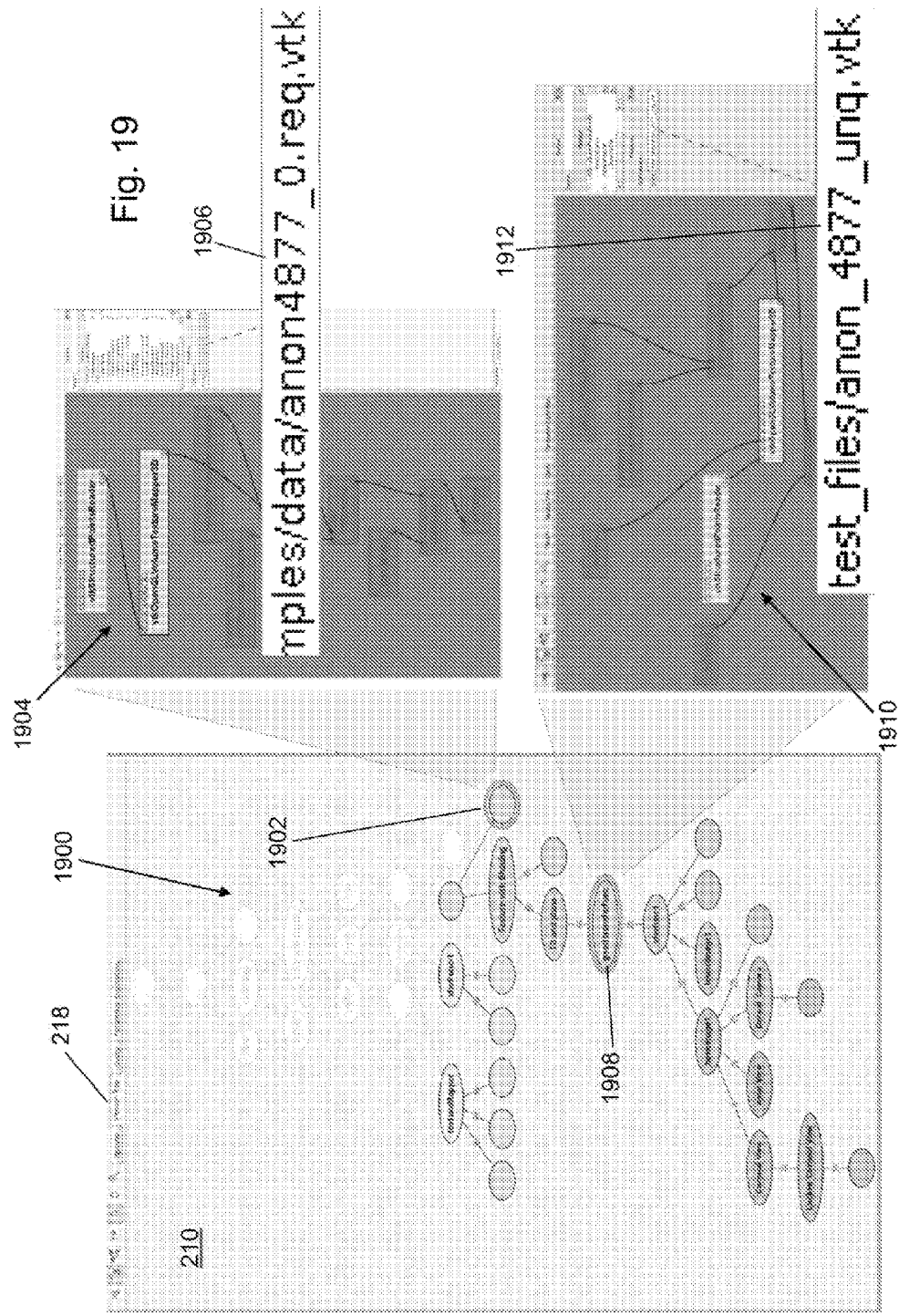
FIG. 19 depicts the user interface of the evolutionary workflow creator application of FIG. 2 displaying a second query result window and displaying a plurality of matching workflows in accordance with an exemplary embodiment.

With reference to FIG. 19, a first query result 1900 is shown in workflow area 210 of version tree tab 218 in accordance with an exemplary embodiment. The workflows which satisfy the complex query are presented in workflow area 210 through highlighting. To further illustrate, a first workflow 1902 exploded to show the matching sub-workflow 1904 and the matching property value 1906 is shown. Additionally, a second workflow 1908 exploded to show the matching sub-workflow 1910 and the matching property value 1912 is shown.

The same interface used to build a workflow is used to query a version tree which includes a plurality of workflows. The current version tree is searched for all workflows that match that query. The matching to identify workflows that contain the query sub-workflow may be determined on a per workflow basis. Specifically, for each workflow, the vertices of the graph induced by the workflow may be topologically sorted. The vertices of the query graph are tested for a match. An exact match may be required or some level of inexactness may be allowed depending on user preference. While each element of the query sub-workflow (modules, connections, parameters, etc.) is included in the match, a candidate workflow that contains more elements than those in the query sub-workflow still satisfies the query. If all vertices match, the candidate workflow is returned as a match. All matches are selected and highlighted in the version tree so that users can quickly see query results. Selecting a workflow from the highlighted version tree displays the workflow with the portion of the workflow that matches the query highlighted as shown with reference matching sub-workflow 1904 and matching sub-workflow 1910.

Differences can assist in optimizing the matching process. For example, given a query workflow $p_q$ and two candidate workflows $p_a$ and $p_b$. If $p_a$ satisfies the query, and the difference $\delta_{ab}$ is known, the domain context of $\delta_{ab}$ can be checked to determine if it contains any elements that match $p_q$. If not, $p_b$ also satisfies the query. Similarly, if $p_a$ does not match $p_q$ and $R(\delta_{ab})$ does not contain the necessary elements for matching $p_q$, $p_b$ does not satisfy the query. Thus, all pipelines that satisfy the query can be determined by iteratively matching and updating the matches based on differences. Every operation performed on a workflow (adding and deleting modules, adding, deleting, and modifying connections, and/or modifying parameters) can be expressed as a (potentially partial) function $f: \vee \to \vee$. $\delta: \vee \to \vee$ is defined as a function on the space of workflows, and $\Delta: \vee \times \vee \to \delta$ as a function that takes two workflows $p_a$ and $p_b$ and produces another function that transforms $p_a$ to $p_b$. For brevity, $\delta_{ab}=\Delta(p_a, p_b)$. Formally, the domain context of $\delta$, $\Delta(\delta)$, is the set of all workflow primitives required to exist for $\delta$ to be applicable. These contexts may be represented as sets of identifiers. For example, if 8 is a function that changes the filename parameter of a module with id 32, $\Delta(\delta)$ is the set containing the module with id 32. Similarly, the range context of $\delta$, $R(\delta)$, is the set of all workflow primitives added or modified by $\delta$. Note that $\Delta(\delta-1)=R(\delta)$, which provides an easy way to compute range contexts.

As discussed with reference to FIGS. 2-10, as a user develops an evolutionary workflow, the entire manipulation sequence is transparently stored in the version tree. Each action f that modifies the workflow (e.g. adding or deleting a module, connecting modules, or changing a parameter) is represented explicitly as a function $f: \vee \to \vee$, where V is the space of all possible workflows. A workflow is the composition of these functions, and is materialized by applying the resulting function to an empty workflow. The action-based formalism associated with capturing the version tree supports the straightforward computation of simple differences. When $p_a<p_b$, $\Delta(p_a, p_b)$ is the sequence of actions to take $p_a$ to $p_b$ which can be read directly from the workflow evolution description. In addition, the inverse operation of f for each type of operation is implemented (i.e., add module versus delete module) so that $\delta_{ba}$ is also easily constructed. However, if $p_a$ not $<p_b$ and $p_b$ not $<p_a$, there exists some $p_c$ (possibly the empty pipeline, though, in general, $p_c$ is the least common ancestor of both $p_a$ and $p_b$) such that $p_c<p_a$ and $p_c<p_b$. Then, $\delta_{ab}=\delta_{ac}\delta_{cb}=\delta_{ca}^{-1}\delta_{cb}$ so $\Delta(p_i, p_j)$ can be found for any two workflows, even if they are not directly related.

The result of workflow matching can either be a binary decision (whether or not the workflows match) or a mapping between the two workflows. The binary decision can be obtained by thresholding the total score of the mapping. If D represents the set of all domain contexts, to identify the best mapping between two workflows, define map: $\vee \times \vee \to (D \to D)$ as a function which takes two pipelines, $p_a$ and $p_b$ as an input and produces a (partial) map from the domain context of $p_a$ to the domain context of $p_c$. The map may be partial in cases where elements of $p_a$ do not have a match in $p_b$ or vice versa. If $p_a<p_b$, map$(p_a)=$map$_{ab}$ is the identity on all elements that were not added or deleted in the process of deriving $p_b$. To construct such a mapping, the problem may be formulated as a weighted graph matching problem. Let $G_a=(V_a, E_a)$ be the graph corresponding to the pipeline $p_a$. $V_a$ represents the modules in $p_a$ and $E_a$ represents the connections in $p_a$. However, other definitions such as the dual of this representation may be used. For $V_a$, a scoring function s: $V_a \times V_b \to [0.0, 1.0]$ defines the compatibility between vertices. For example, the score of two modules that are exactly the same might be 1.0 and the score of two modules that differ except that one is a subclass of the other might be 0.6. A matching between $G_a$ and $G_b$ may be defined as a set of pairs of vertices $M=\{(v_a, v_b)\}$ where $v_a \in V_a$ and $v_b \in V_b$. A matching is good when $$\sum_{(v_a, v_b) \in M} s(v_a, v_b)$$

is maximized. A good matching on workflows corresponds to a good matching of their representative graphs. Given a good matching M, a mapping from $p_a$ to $p_b$ is defined as $v_a \to v_b$ for all $(v_a, v_b) \in M$.

In an exemplary matching algorithm, the standard graph representation is used where vertices correspond to modules and edges to connections. In addition, even though discrimination between input and output ports can be included, directionality is not enforced on the edges so that similarity can be diffused along them. In workflow matching, a mapping from the context of one workflow to another is determined. To do so, the workflows are converted to labeled graphs and a scoring function is defined for nodes based on their labels. With a graph for each workflow, the mapping by pairing nodes that score well is computed and connectivity constraints are enforced between the pairs.

Let $G_a$ and $G_b$ be the graphs corresponding to $p_a$ and $p_b$. A connection between two vertices a and b can be denoted as a~b and the scoring function that measures the similarity of vertices can be defined by $$s(v_a, v_b) = \frac{|\text{ports}(v_a) \cap \text{ports}(v_b)|}{|\text{ports}(v_a)| + |\text{ports}(v_b)|}$$

where ports(v) denotes the ports of the module corresponding to vertex v. This scoring function emphasizes port matching to give modules that can be substituted for each other a high score. Such a substitution depends solely on the compatibility of the input and output ports and not on a module name or functionality. This scoring function is defined only for nodes, and therefore does not help in comparing the topologies of the workflows. While a simple maximum bipartite matching between nodes may succeed in finding a map between nodes, the connectivity constraints of the graphs should be enforced. Intuitively, the similarity between vertices as a weighted average between how compatible the modules are and how similar their neighborhoods are is desired. In an exemplary embodiment, the similarity score strikes a balance between the locality of pairwise compatibility and the overall similarity of the neighborhood. A graph $G=G_a \times G_b$ that combines both $G_a$ and $G_b$ is created in which a vertex $v_{a,b}$ is defined for each pair of vertices $v_a \in V_a$ and $v_b \in V_b$. Similarly, an edge $v_{i,j} \sim v_{k,l}$ exists when $v_i \sim v_k$ in $G_a$ and $v_j \sim v_l$ in $G_b$. G is the graph categorical product of $G_a$ and $G_b$. The connectivity of G encodes the pairwise neighborhoods of the vertices in $G_a$ and $G_b$.

To translate the algorithm into an iterative algorithm, $\pi_k(G)$ is the measure of pairwise similarity after k steps; A(G) is the adjacency matrix of G normalized so that the sum of each row is one where a row with sum zero is modified to be uniformly distributed; c(G) is the normalized vector whose elements are the scores for the paired vertices in G; and α is a user-defined parameter that determines the tradeoff between pairwise scoring and connectivity. To iteratively refine the estimate, the neighborhood similarity is diffused according to $$\pi_{k+1} = \alpha A(G)\pi_k (1-\alpha)c(G) = M_G \pi_k \quad (1).$$

The final pairwise similarity between modules is given by $\pi_\infty = \lim_{k \to \infty} \pi_k$. In general, c(G) provides a good measure of similarity so that A(G) may be used to break ties between multiple alternatives. Thus, a small weight α, such as α=0.15, is chosen for the neighborhood. $M_G$ in Equation 1 is a linear operator; therefore, if p converges, it does so to an eigenvector. Based on the theory of Markov chains, the special structure of $M_G$ has a spectrum $((1, \alpha, \alpha^2, \ldots))$ so that the iteration is exactly the power method for eigenvalue calculation. Therefore, the iteration converges to a single dominant eigenvector, and each iteration improves the estimate linearly by 1-α. Because a small α is used, a rapid convergence is achieved. From the iteration, $\pi_\infty$ is obtained, which contains the relative probabilities of $v_a \in G_a$ and $v_b \in G_b$ matching for each possible pair. For each vertex in $v_a$, the vertex in $v_b$ whose pair has the maximum value in $\pi_\infty$ is considered the match. Thus, the most likely pairing is determined based on the similarity measure. For example, even where data types may not match exactly, the most likely match is determined from among the possible modules.

Whereas the query interface allows users to identify workflows (and sub-workflows) that are relevant for a particular task, a result determination by analogy mechanism provides for the reuse of the identified workflows in constructing new results in a semi-automated manner and without requiring users to directly manipulate or edit the workflow specifications. For example, a user may wish to improve a given result by modifying parameters in a similar fashion to a previously determined result. Alternatively, the user may want to modify an existing workflow to use a new technique that generates higher quality visualizations. The difference between a pair of workflows is determined, and the difference is applied to a third workflow to define a fourth workflow. The user need not have a priori knowledge of the exact details of the three workflows to perform the operation. To apply an analogy to a workflow, the user defines an analogy template by selecting two workflows whose difference is to be applied to a third workflow selected by the user. The analogy is applied to the third workflow to create a new fourth workflow. In an exemplary embodiment, the user can cause execution of these operations using either workflow creator application 122 or result presentation application 124.

Figure 20:
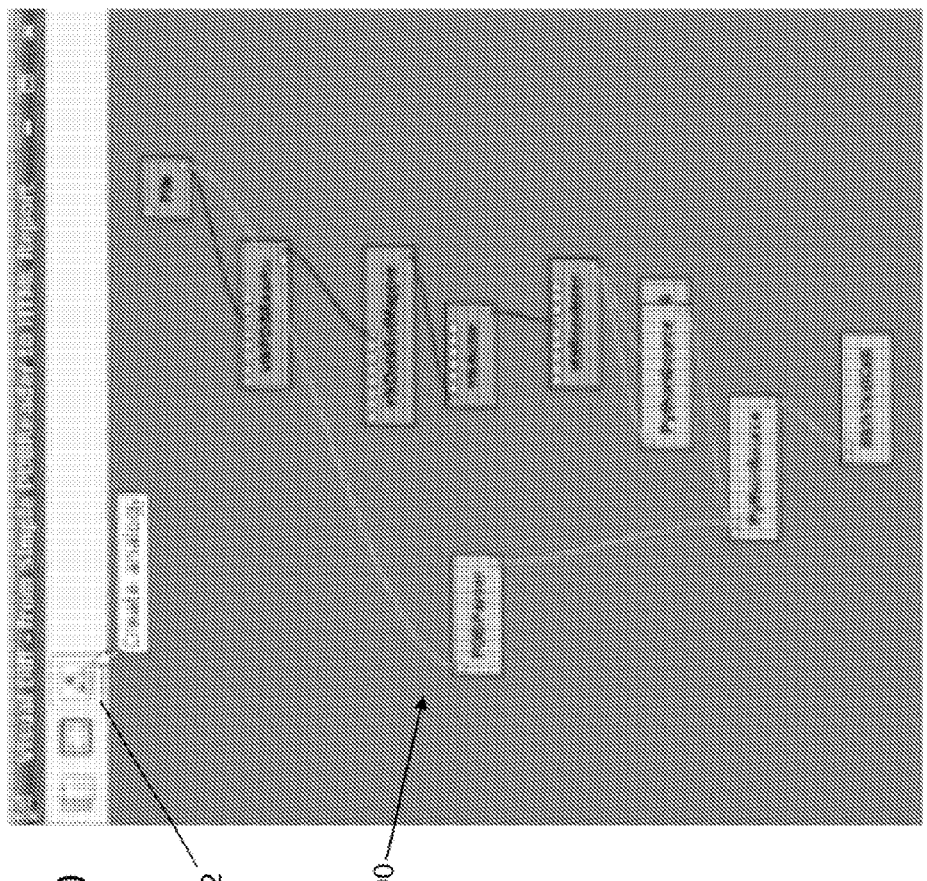
FIG. 20 depicts the user interface of the evolutionary workflow creator application of FIG. 2 displaying a second visual workflow difference window in accordance with an exemplary embodiment.
Figure 21:
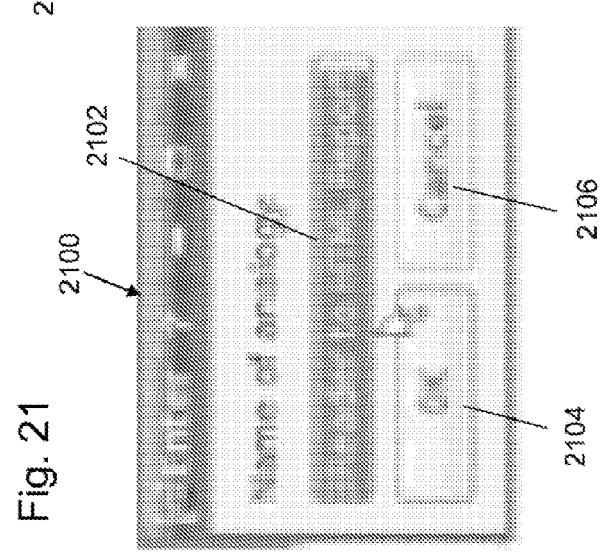
FIG. 21 depicts the user interface of the evolutionary workflow creator application of FIG. 2 displaying an analogy naming window in accordance with an exemplary embodiment.

Using workflow creator application 122, an analogy may be defined by dragging a first workflow representing an initial workflow to a second workflow representing the desired result. As discussed previously with reference to FIG. 9, this operation displays the difference between the selected workflows. As shown with reference to FIG. 20, a workflow difference 2000 indicates module additions/deletions, connection additions/deletions/modifications, and parameter modifications. To create an analogy based on the difference between the workflows, the user may select a create analogy button 2002. With reference to FIG. 21, an analogy naming window 2100 is presented to the user. Analogy naming window 2100 includes an analogy name text box 2102. The user defines a name for the analogy using analogy name text box 2102. The user selects an "OK" button 2104 to create the analogy with the defined name or a "Cancel" button 2106 to cancel the analogy creation.

Figure 22:
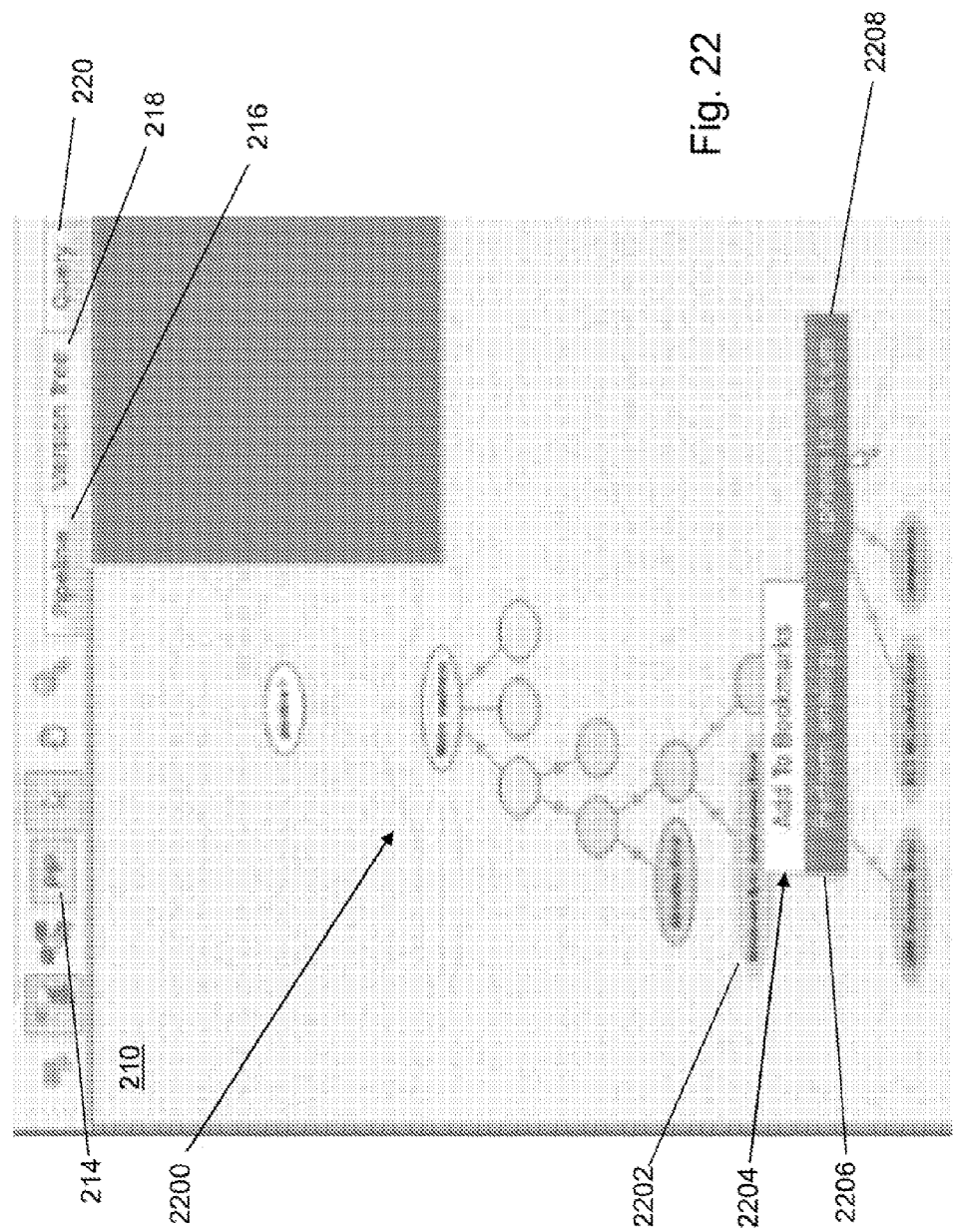
FIG. 22 depicts the user interface of the evolutionary workflow creator application of FIG. 2 displaying an analogy application window in accordance with an exemplary embodiment.

With reference to FIG. 22, the user applies an analogy by selecting a third workflow 2202 presented in a version tree 2200 of workflow area 210 of version tree tab 218 and selecting the analogy for application to the third workflow 2202. For example, the user may right-click after selection of third workflow 2202, causing presentation of a process selection window 2204. Process selection window 2204 may include a "Perform analogy . . . " item 2206. Scrolling down to "Perform analogy . . . " item 2206 causes presentation of an analogy list 2208 from which the user may select. For example, with reference to FIG. 22, analogy list 2208 includes a single created analogy named "sphere to silicium". A fourth workflow is created in version tree 220 which may be executed and a result presented in a cell of result presentation application 124 as discussed previously relative to FIGS. 10 and 11.

Figure 24:
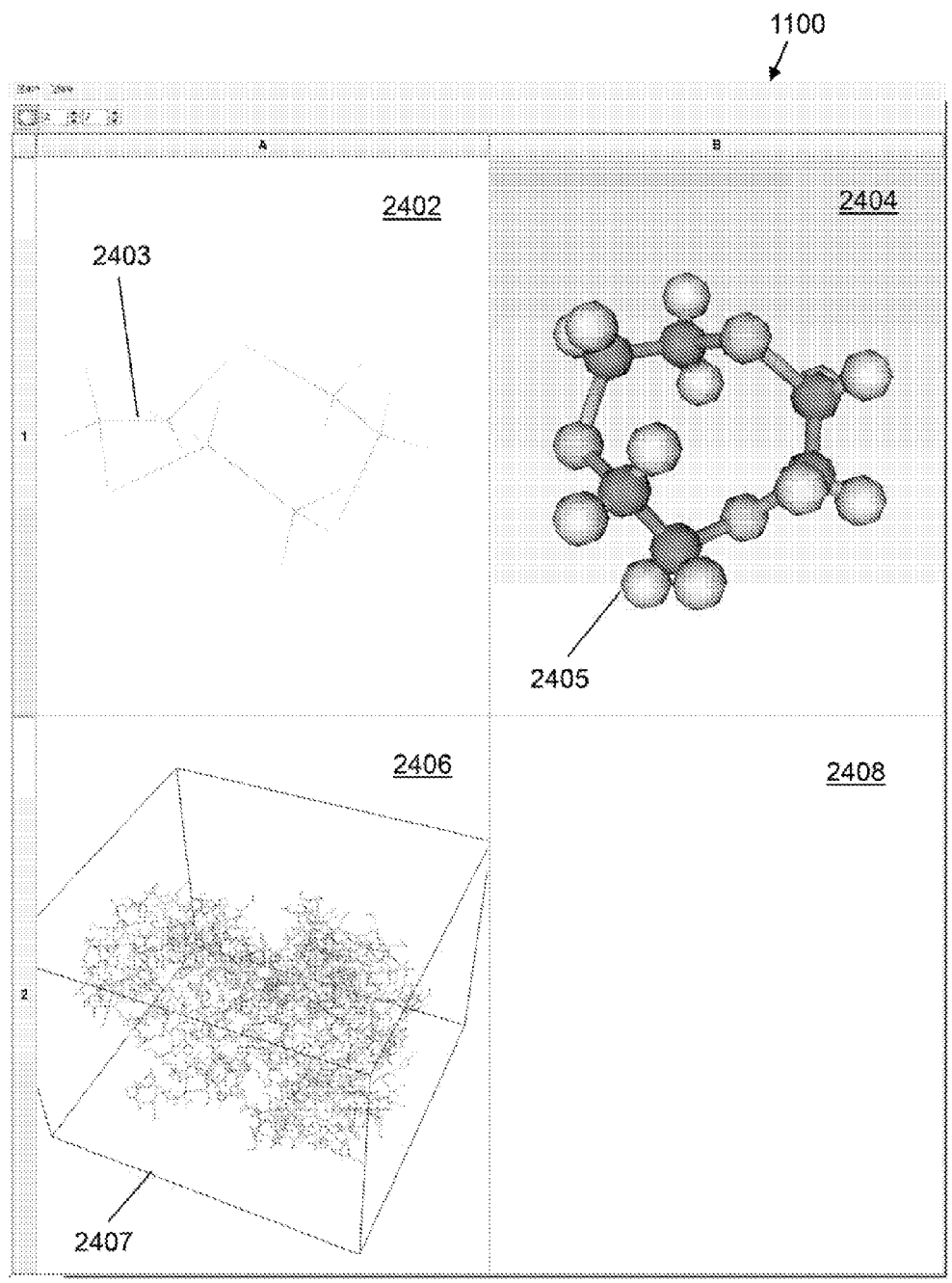
FIG. 24 depicts the user interface of the result presentation application showing third exemplary results in accordance with a third exemplary embodiment.

Using result presentation application 124, an analogy may be defined and applied without interacting with the version tree of workflow creator application 122. Result presentation application 124 supports an interaction mode and an edit mode. In the edit mode, a user can create an analogy by dragging one cell into another cell thereby creating an analogy based on a comparison between the workflows used to create the results presented in the respective cells. To apply the analogy, the user drags the workflow to be modified to a new cell, the analogy is applied, and the result of the new workflow is presented to the user in the cell to which the workflow to be modified is dragged. For example, with reference to FIG. 24, a plurality of data products are shown in result presentation window 1100 of result presentation application 124 in accordance with a third exemplary embodiment. Result presentation window 1100 of FIG. 24 includes a first cell 2402, which includes a first result 2403, a second cell 2404, which includes a second result 2405, a third cell 2406, which includes a third result 2407, and a fourth cell 2408 which is empty. Thus, three workflows have been executed to generate results presented in three cells of result presentation application 124.

Figure 25:
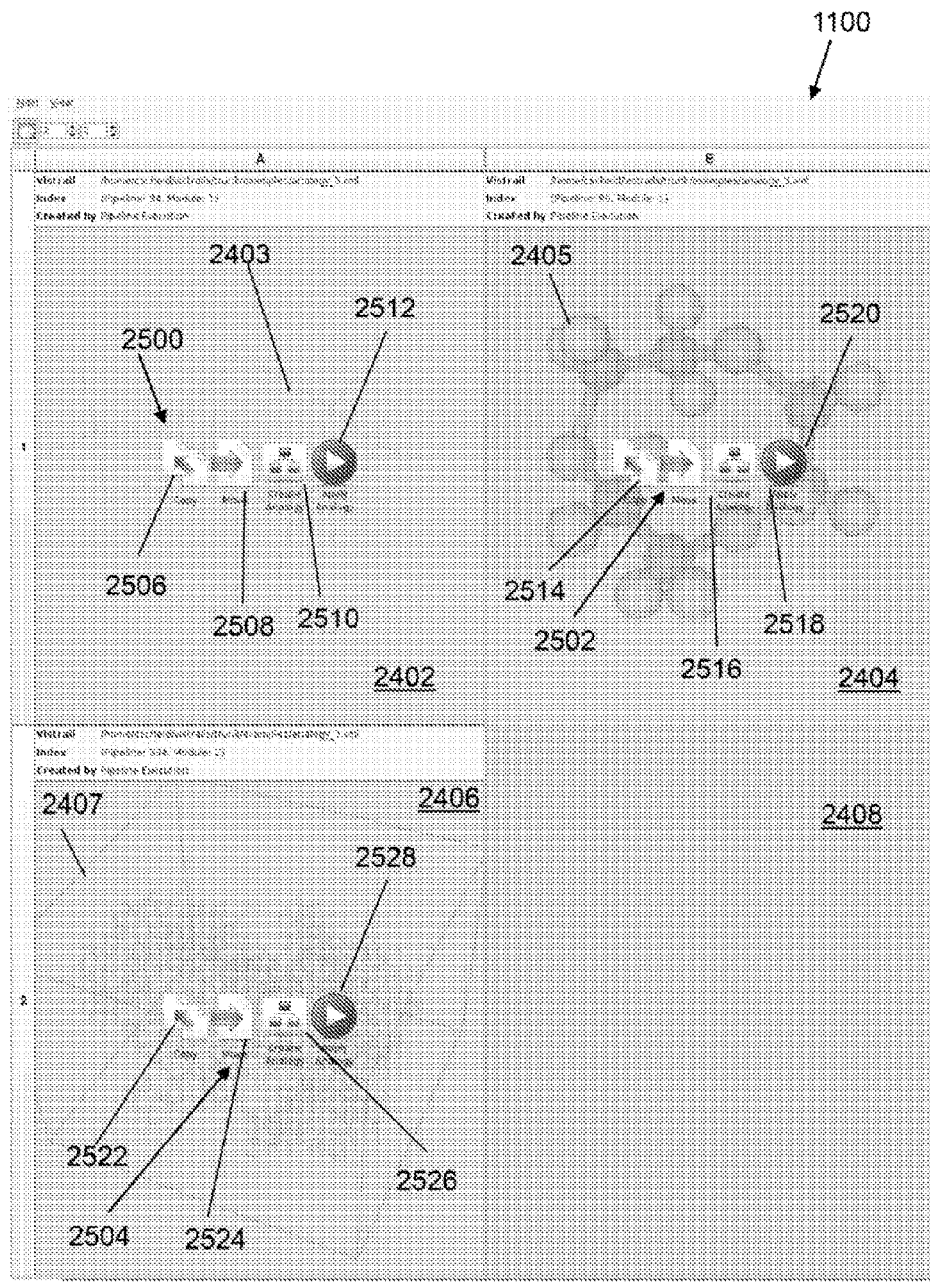
FIG. 25 depicts the user interface of the result presentation application including analogy creation controls in accordance with an exemplary embodiment.

The user switches from an interaction mode of result presentation application 124 to an edit mode of result presentation application 124, for example, using a menu item selector or a button. The edit mode allows, among other things, the creation and execution of one or more analogy. With reference to FIG. 25, a first control set 2500 is presented in first cell 2402, a second control set 2502 is presented in second cell 2404, and a third control set 2504 is presented in third cell 2406 in response to switching to the edit mode. First control set 2500 may include a copy control 2506, a move control 2508, a "create analogy" control 2510, and an "apply analogy" control 2512. Second control set 2502 may include a copy control 2514, a move control 2516, a "create analogy" control 2518, and an "apply analogy" control 2520. Third control set 2504 may include a copy control 2522, a move control 2524, a "create analogy" control 2526, and an "apply analogy" control 2528. To create an analogy, the user drags one of the "create analogy" controls 2510, 2518, 2526 from the cell corresponding to the source to the cell corresponding to the target. For example, to create an analogy between first cell 2402 and second cell 2404, the user drags "create analogy" control 2510 from first control set 2500 to second cell 2404 and releases "create analogy" control 2510. The workflow associated with creation of first result 2403 is the first workflow, and the workflow associated with creation of second result 2405 is the second workflow, and an analogy is defined based on a difference between the first workflow and the second workflow.

Figure 26:
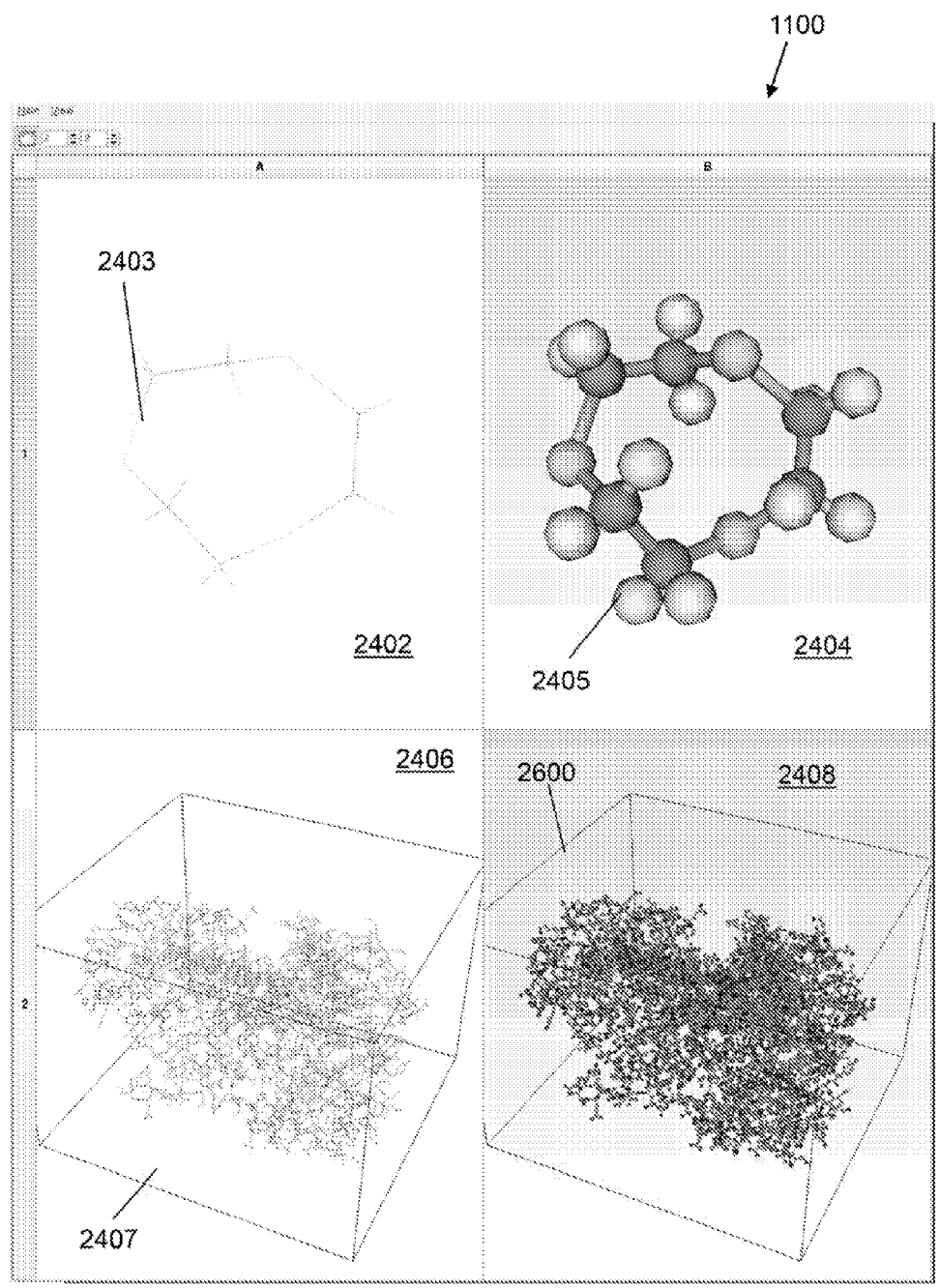
FIG. 26 depicts the user interface of the result presentation application showing fourth exemplary results in accordance with a fourth exemplary embodiment.

To apply the defined analogy, the user drags an "apply analogy" control 2512, 2520, 2528 from the cell that corresponds to the result on which the analogy is applied, and drops it into an empty cell which is used to display the results of the analogy. For example, to apply the analogy created between the first workflow and the second workflow, the user drags "apply analogy" control 2528 from third control set 2504 to fourth cell 2408, and releases "apply analogy" control 2528. The result of the analogy is automatically inserted in the version tree, as discussed with reference to FIG. 22. With reference to FIG. 26, fourth cell 2408 includes a fourth result 2600 determined based on application of the created analogy to third result 2407.

Two ordered pairs are analogous if the relationship between the first pair mirrors the relationship between the second pair. Therefore, if the relationship between a first workflow $p_a$ and a second workflow $p_b$ is known and a third workflow $p_c$ is identified, a fourth workflow $p_d$ pair can be determined. To implement such an operation automatically, a workflow difference is determined between $p_a$, $p_b$ and applied to $p_c$. However, updating $p_c$ with an arbitrary $\delta$ may fail if $p_c$ does not contain the domain context of $\delta$. As a result, the difference is mapped so that it can be applied to $p_c$. Thus, in a first operation the difference $\delta_{ab} = \Delta(p_a, p_b)$ is determined. In a second operation, matching is performed between $G_a$ and $G_c$ to obtain the map $map_{ac} = map(p_a, p_c)$. In a third operation the mapped difference $\delta^*_{cb} = map_{ac}(p_a, p_b)$ is determined. In a fourth operation, $p_d$ is determined as $\delta^*_{cb}(p_c)$. The fourth workflow $p_d$ can be executed to present a result in a cell of result presentation application 124.

For example, to update inputs in multiple workflows, a user may perform a query to identify matching workflows. A desired update to a matching workflow can be performed and an analogy created between the desired update $p_b$ and the matching workflow $p_a$. The analogy can be applied to all of the identified matching workflows creating child workflows for each of the identified matching workflows based on the created analogy. The child workflows can be executed and the corresponding results presented in cells of result presentation application 124 automatically.

Figure 23:
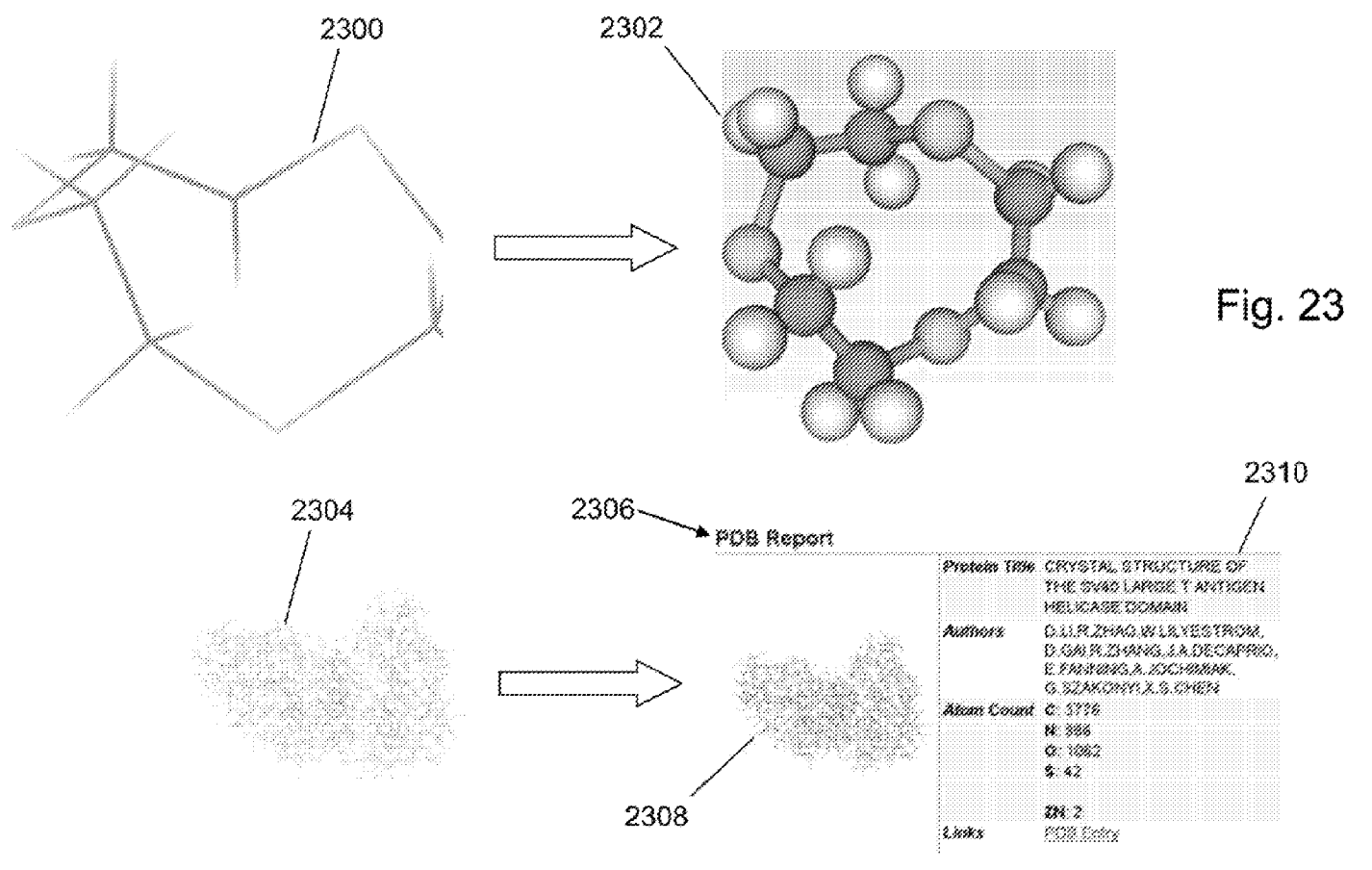

As another example, analogies can be used to quickly combine three different techniques to transform a simple workflow into a visualization that is more complicated and more useful. In many areas, the amount of data and the need for interaction between users across the world has led to the creation of online databases that store much of the domain information required. Analogies can be used to modify a simple workflow that visualizes protein data stored in a local file to obtain data from an online database, to create an enhanced visualization for that protein, and to publish the results as an HTML report. A version tree that includes workflows that accomplish each of the individual goals is opened in workflow creator application 122. A first workflow $p_0$ reads a file with protein data and generates a first result of that data. The difference between a second workflow $p_1$ and a third workflow $p'_1$ is that $p_1$ reads a local file and $p'_1$ reads data from an online database. The difference between a fourth workflow $p_2$ and a fifth workflow $p'_2$ is that $p_2$ uses a simple line-based rendering 2300 and $p'_2$ improves the rendering to use a ball-and-stick model 2302 as shown with reference to FIG. 23. The difference between a sixth workflow $p_3$ and a seventh workflow $p'_3$ is that $p_3$ displays a visualization 2304 while $p'_3$ generates an HTML report 2306 that contains a visualized image 2308 and a protein summary 2310. To create a new workflow using all three differences, a first analogy between $p_1$ and $p'_1$ is determined and applied to $p_0$ to create a first new workflow. A second analogy between $p_2$ and $p'_2$ is determined and applied to the first new workflow to create a second new workflow. A third analogy between $p_3$ and $p'_3$ is determined and applied to the second new workflow to create a third new workflow $p^*_0$. Third new workflow $p^*_0$ prompts the user for a protein name, uses that information to download data for that protein, creates a ball-and-stick visualization of the data, and embeds that image in an HTML report. A new result is determined quickly and with a reduced understanding of the steps required to form the new result.

The word "exemplary" is used herein to mean serving as an example, instance, or illustration. Any aspect or design described herein as "exemplary" is not necessarily to be construed as preferred or advantageous over other aspects or designs. Further, for the purposes of this disclosure and unless otherwise specified, "a" or "an" means "one or more". The exemplary embodiments may be implemented as a method, apparatus, or article of manufacture using standard programming and/or engineering techniques to produce software, firmware, hardware, or any combination thereof to control a computer to implement the disclosed embodiments. The term "computer readable medium" can include, but is not limited to, magnetic storage devices (e.g., hard disk, floppy disk, magnetic strips, . . . ), optical disks (e.g., compact disk (CD), digital versatile disk (DVD), . . . ), smart cards, flash memory devices, etc. Additionally, it should be appreciated that a carrier wave can be employed to carry computer-readable media such as those used in transmitting and receiving electronic mail or in accessing a network such as the Internet or a local area network (LAN).

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The functionality described may be implemented in a single executable or application or may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of creating an analogous workflow, the method comprising:
receiving a first indicator of a first workflow by a first computing device, wherein the first workflow comprises a first plurality of modules, wherein the first plurality of modules are connected to define a first plurality of connected modules;

receiving a second indicator of a second workflow by the first computing device, wherein the second workflow comprises a second plurality of modules, wherein the second plurality of modules are connected to define a second plurality of connected modules;
receiving a third indicator of a third workflow by the first computing device, wherein the third workflow comprises a third plurality of modules, wherein the third plurality of modules are connected to define a third plurality of connected modules;
determining an analogy workflow by the first computing device based on a difference between the first workflow and the second workflow;
applying the determined analogy workflow to the third workflow by the first computing device to define a fourth workflow; and
presenting the defined fourth workflow to a user by the first computing device.

2. The method of claim 1, wherein the difference between the first workflow and the second workflow comprises an action wherein the action is selected from the group consisting of a parameter modification, a module addition, a module deletion, and a connection modification.

3. The method of claim 1, further comprising:
executing the fourth workflow by the first computing device to form a result; and
presenting the result to the user by the first computing device.

4. The method of claim 1, further comprising:
determining, by the first computing device, a mapping workflow between the first workflow and the third workflow;
wherein determining the analogy workflow comprises determining a difference mapping between the determined mapping workflow and the second workflow.

5. A system comprising:
a processor; and
a computer-readable medium operably coupled to the processor, the computer-readable medium having computer-readable instructions stored thereon that, when executed by the processor, cause the system to
receive a first indicator of a first workflow, wherein the first workflow comprises a first plurality of modules, wherein the first plurality of modules are connected to define a first plurality of connected modules;
receive a second indicator of a second workflow, wherein the second workflow comprises a second plurality of modules, wherein the second plurality of modules are connected to define a second plurality of connected modules;
receive a third indicator of a third workflow, wherein the third workflow comprises a third plurality of modules, wherein the third plurality of modules are connected to define a third plurality of connected modules;
determine an analogy workflow based on a difference between the first workflow and the second workflow;
apply the determined analogy workflow to the third workflow to define a fourth workflow; and
present the defined fourth workflow to a user.

6. A non-transitory computer-readable medium having stored thereon computer-readable instructions that when executed by a computing device cause the computing device to:
receive a first indicator of a first workflow, wherein the first workflow comprises a first plurality of modules, wherein the first plurality of modules are connected to define a first plurality of connected modules;
receive a second indicator of a second workflow, wherein the second workflow comprises a second plurality of modules, wherein the second plurality of modules are connected to define a second plurality of connected modules;
receive a third indicator of a third workflow, wherein the third workflow comprises a third plurality of modules, wherein the third plurality of modules are connected to define a third plurality of connected modules;
determine an analogy workflow based on a difference between the first workflow and the second workflow;
apply the determined analogy workflow to the third workflow to define a fourth workflow; and
present the defined fourth workflow to a user.

7. The computer-readable medium of claim 6, wherein a first module of the first plurality of modules comprises a computer-executable instruction.

8. The computer-readable medium of claim 7, wherein a second module of the first plurality of modules comprises a second computer-executable instruction, and further wherein the first module and the second module are connected by an output port of the first module and an input port of the second module which indicate a data parameter used by the first module and the second module.

9. The computer-readable medium of claim 6, wherein the difference is determined by comparing the second plurality of connected modules to the first plurality of connected modules.

10. The computer-readable medium of claim 9, wherein the difference between the first workflow and the second workflow comprises an action wherein the action is selected from the group consisting of a parameter modification to a value of a parameter of the first plurality of connected modules, a module addition to the first plurality of connected modules, a module deletion from the first plurality of connected modules, and a connection modification between two modules of the first plurality of connected modules.

11. The computer-readable medium of claim 6, wherein the computer-readable instructions further cause the computing device to present a user interface window to the user, to receive an analogy workflow name defined by the user using the presented user interface window, and to store the determined analogy workflow in association with the received analogy workflow name.

12. The computer-readable medium of claim 11, wherein the stored analogy workflow is applied to the third workflow to define a fourth workflow after receipt of selection by the user of a third workflow indicator associated with the third workflow and of selection by the user of the analogy workflow name presented in a second user interface window.

13. The computer-readable medium of claim 6, wherein the computer-readable instructions further cause the computing device to:
execute the first workflow to form a first result;
execute the second workflow to form a second result;
execute the third workflow to form a third result; and
present the first result, the second result, and the third result to the user in a user interface window.

14. The computer-readable medium of claim 13, wherein the analogy workflow is determined after receipt of a fourth indicator indicating selection by the user of the first result and the second result in the user interface window.

15. The computer-readable medium of claim 14, wherein the determined analogy workflow is applied after receipt of a fifth indicator indicating selection by the user of the third result in the user interface window.

16. The computer-readable medium of claim 6, wherein the computer-readable instructions further cause the computing device to:
- determine a mapping workflow between the received first workflow and the received third workflow by identifying matching modules between the received first workflow and the received third workflow;
- determine a mapped difference by applying the determined mapping workflow to the difference between the received first workflow and the received second workflow;
- wherein the analogy workflow is the determined mapped difference.

17. The computer-readable medium of claim 6, wherein the computer-readable instructions further cause the computing device to:
- receive a query workflow;
- identify the first workflow from a plurality of workflows, the first workflow at least partially matching the received query workflow based on a first similarity score calculated between the query workflow and the first workflow;
- identify the third workflow from the plurality of workflows, the third workflow at least partially matching the received query workflow based on a second similarity score calculated between the query workflow and the third workflow; and
- define the second workflow based on a user modification to the first workflow.

18. The computer-readable medium of claim 17, wherein the query workflow comprises a module.

19. The computer-readable medium of claim 17, wherein the query workflow comprises a fourth plurality of connected modules.

20. The computer-readable medium of claim 17, wherein the computer-readable instructions further cause the computing device to calculate the first similarity score by:
- converting the query workflow to a first graph representation, wherein the first graph representation comprises a first module represented as a vertex and a first connection represented as an edge;
- converting the first workflow to a second graph representation, wherein the first plurality of modules are represented as vertexes in the second graph representation and the connections between the first plurality of connected modules are represented as edges in the second graph representation;
- creating a graph representation that combines the first graph representation and the second graph representation by defining a vertex for each pair of vertices of the first graph representation and the second graph representation and by defining an edge $v_{i,j} \sim v_{k,l}$ when $v_i \sim v_k$ in the first graph representation and $v_j \sim v_l$ in the second graph representation exists; and
- determining a normalized vector, wherein the normalized vector includes a score for paired vertices of the created graph representation.

* * * * *